(12) United States Patent
Kawashima et al.

(10) Patent No.: US 7,180,694 B2
(45) Date of Patent: Feb. 20, 2007

(54) RECORDING AND/OR REPRODUCING APPARATUS, RECORDING AND/OR REPRODUCING METHOD, RECORDING MEDIUM AND PROGRAM

(75) Inventors: Takashi Kawashima, Tokyo (JP); Yutaka Okazaki, Tokyo (JP); Yoichi Kanemaki, Kanagawa (JP)

(73) Assignee: Sony Corporation (JP)

( * ) Notice: Subject to any disclaimer, the term of this patent is extended or adjusted under 35 U.S.C. 154(b) by 302 days.

(21) Appl. No.: 10/657,695

(22) Filed: Sep. 8, 2003

(65) Prior Publication Data
US 2004/0057147 A1    Mar. 25, 2004

(30) Foreign Application Priority Data
Sep. 10, 2002    (JP) ............................ P2002-264362

(51) Int. Cl.
*G11B 15/18* (2006.01)

(52) U.S. Cl. .................... 360/72.3; 360/25; 360/77.12; 360/73.11; 360/73.14

(58) Field of Classification Search ...................... None
See application file for complete search history.

(56) References Cited

U.S. PATENT DOCUMENTS

| | | | | |
|---|---|---|---|---|
| 4,766,507 A | * | 8/1988 | Kashida et al. | 360/72.2 |
| 4,916,555 A | * | 4/1990 | Hathaway et al. | 386/78 |
| 5,121,264 A | * | 6/1992 | Ii | 360/64 |
| 5,189,572 A | * | 2/1993 | Gooch | 360/77.12 |
| 5,481,514 A | * | 1/1996 | Yamasaki et al. | 369/30.85 |
| 5,550,684 A | * | 8/1996 | Shih et al. | 360/48 |
| 5,844,737 A | * | 12/1998 | Fukuoka et al. | 360/18 |
| 5,912,780 A | * | 6/1999 | Yamada et al. | 360/64 |
| 5,963,388 A | * | 10/1999 | Yoshida et al. | 360/70 |
| 6,122,129 A | * | 9/2000 | Aoki et al. | 360/73.06 |
| 6,236,800 B1 | * | 5/2001 | Nishima et al. | 386/46 |
| 6,424,483 B1 | * | 7/2002 | Honjo et al. | 360/73.11 |
| 7,046,466 B1 | * | 5/2006 | Molstad et al. | 360/48 |

* cited by examiner

*Primary Examiner*—Wayne Young
*Assistant Examiner*—Dismery Mercedes
(74) *Attorney, Agent, or Firm*—Lerner, David, Littenberg, Krumholz & Mentlik, LLP

(57) ABSTRACT

A recording apparatus of a tape-shaped magnetic recording medium includes a transfer unit, a recording head, a signal-processing unit and a control unit. The transfer unit transfers a tape-shaped magnetic recording medium having an anisotropic property oblique with respect to the thickness direction in a forward or reversed direction. The recording head is positioned in such a way that a recording track is formed on the traveling tape-shaped magnetic recording medium, which is transferred by the transfer unit, in a direction parallel to the transfer direction of the tape-shaped magnetic recording medium. Connected to the recording head, the signal-processing unit receives a signal to be recorded onto the tape-shaped magnetic recording medium. The signal-processing unit then carries out signal processing required for an operation to write the signal to be recorded onto the tape-shaped magnetic recording medium. The control unit controls at least the operation of the signal-processing unit and detects the transfer direction of the tape-shaped magnetic recording medium transferred by the transfer unit, controlling the transfer unit on the basis of a result of detection.

39 Claims, 23 Drawing Sheets

| TEST ENVIRONMENT | ORDINARY TEMPERATURE AND ORDINARY HUMIDITY |
|---|---|
| DRUM REVOLUTION SPEED | 1300rpm FORWARD DIRECTION (CW) AND REVERSED DIRECTION (CCW) |
| TAPE | THIN-LAYER COBALT OBLIQUE MAGNETIC TAPE (Hc OF 105kA/m AND Mr·t OF 1.6 memu/cc) |
| RECORDING HEAD | MIG HEAD (TRACK WIDTH OF 12 $\mu$m AND EFFECTIVE GAP LENGTH OF 0.21 $\mu$m) |
| REPRODUCING HEAD | MR HEAD (DEVICE TRACK WIDTH OF 9 $\mu$m AND INTER-SHIELD GAP LENGTH OF 0.23 $\mu$m) |
| HEAD/TAPE RELATIVE SPEED | 6.8m/s |
| RECORDING FREQUENCY AT THE TIME OF MEASUREMENT OF SOLITARY WAVE HALF BAND WIDTH (PW50) AND SOLITARY WAVE OUTPUT (IS TAA) | 1MHz |

FORWARD DIRECTION
LINE RECORDING DENSITY OF 170 kfci
PR4 EQUALIZATION SDNR OF 23.7 dB REVERSED DIRECTION
LINE RECORDING DENSITY OF 170 kfci
PR1 EQUALIZATION SDNR OF 21.9 dB

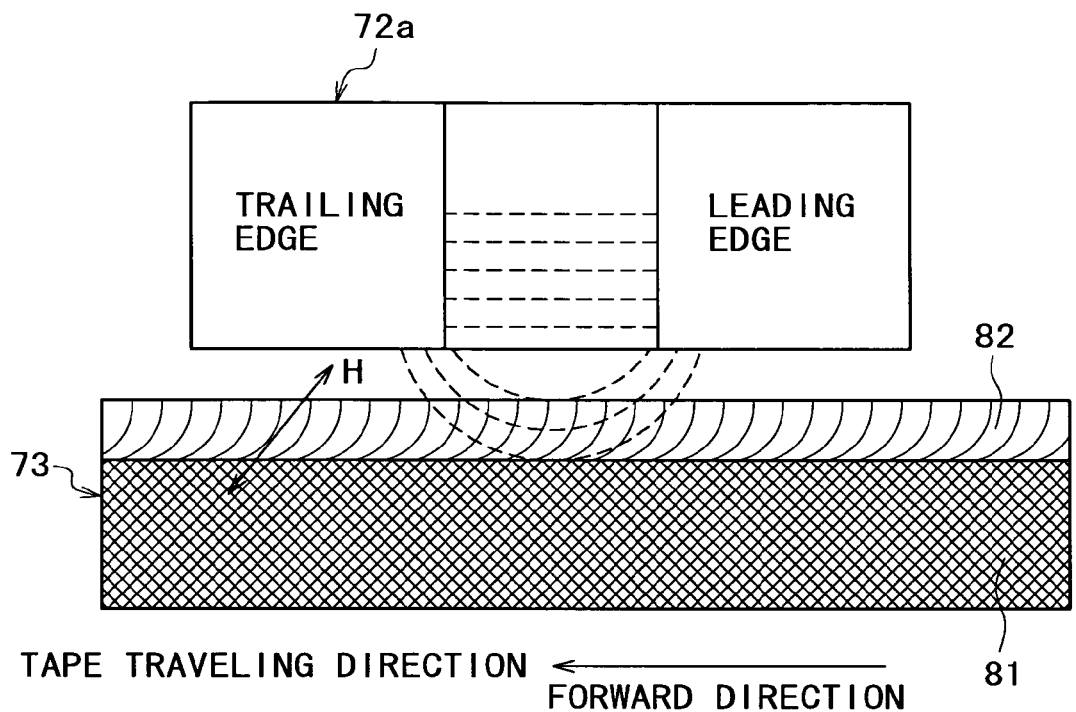
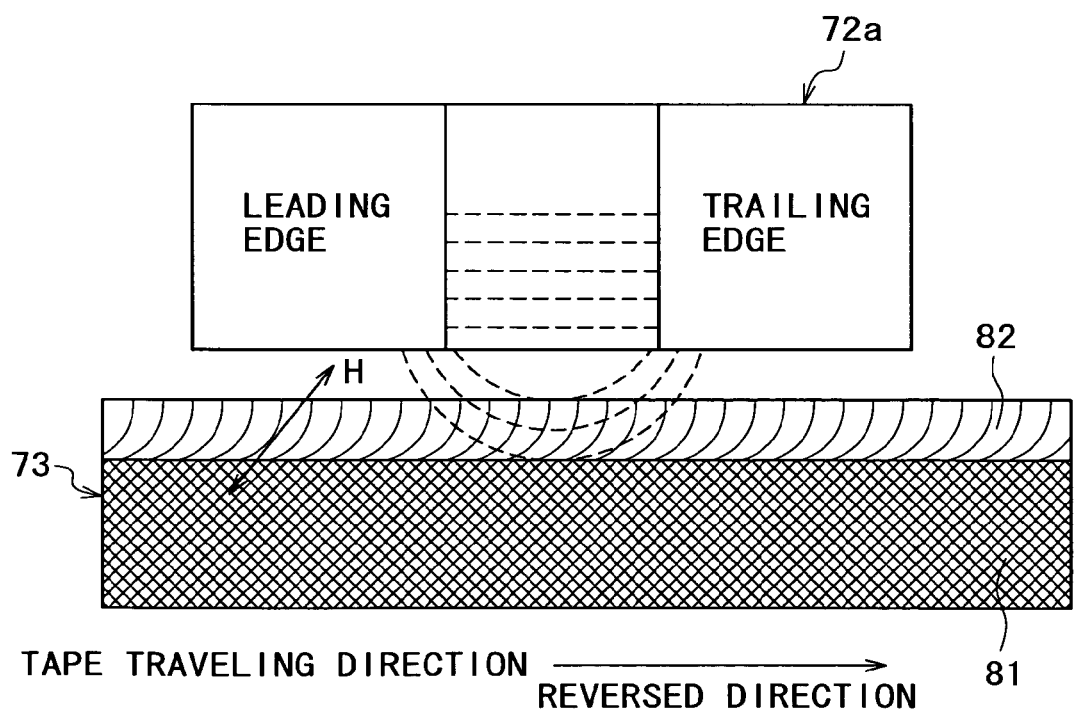

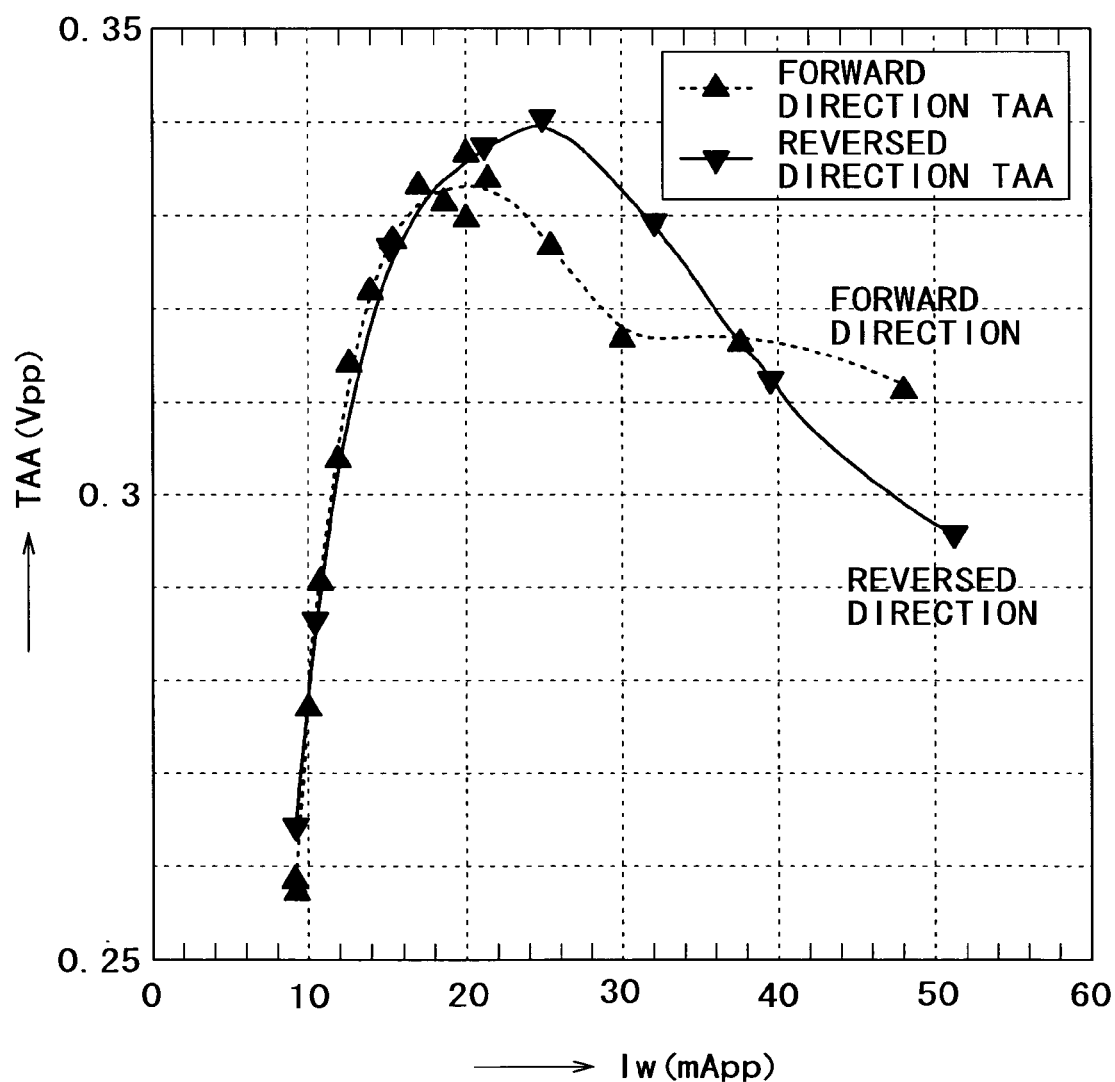

TAPE:THIN-LAYER COBALT OBLIQUE EVAPORATION TAPE
RECORDING HEAD:MIG(TRACK WIDTH OF 12 $\mu$m)
REPRODUCING HEAD:MR(DEVICE TRACK WIDTH OF 9 $\mu$m
                     AND INTER-SHIELD GAP LENGTH OF
                     0.23 $\mu$m)
HEAD/TAPE RELATIVE SPEED:6.8m/s
RECORDING FREQUENCY:1MHz

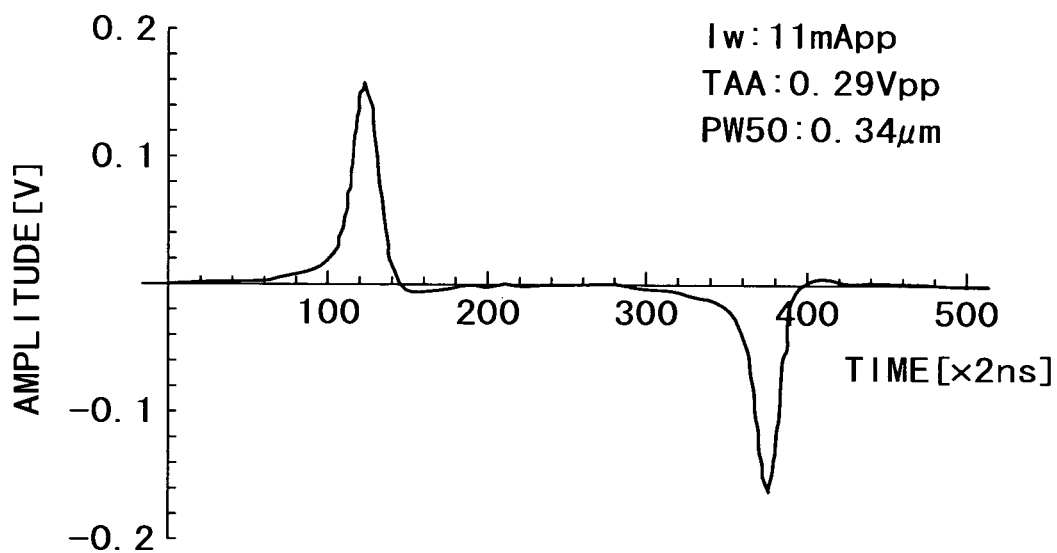
F I G. 17
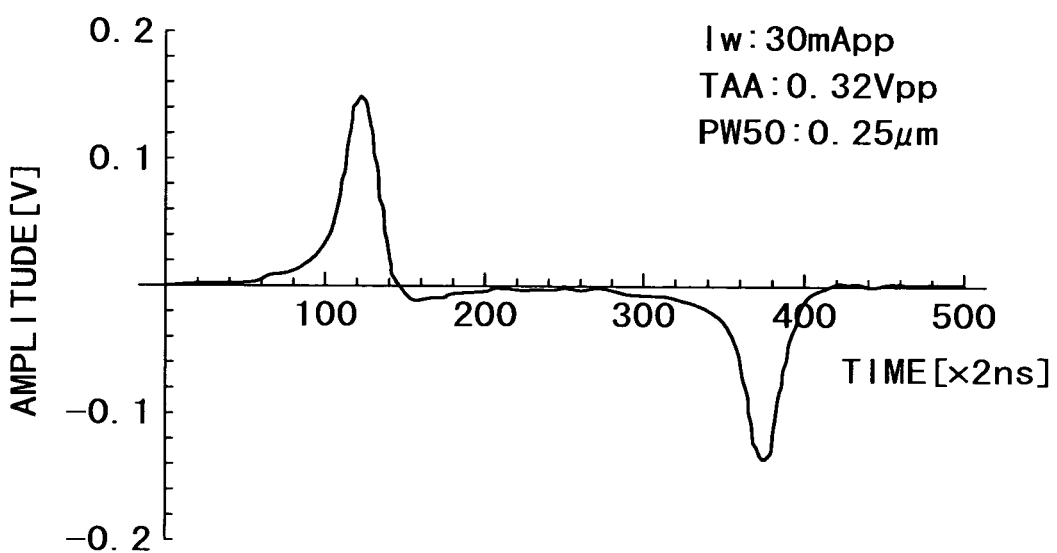
F I G. 18

RECORDING AND/OR REPRODUCING APPARATUS, RECORDING AND/OR REPRODUCING METHOD, RECORDING MEDIUM AND PROGRAM

BACKGROUND OF THE INVENTION

The present invention relates to a recording and/or reproducing apparatus, a recording and/or reproducing method, a recording medium and a program. To be more specific, the present invention relates to a recording and/or reproducing apparatus for tape-shaped recording medium. Even more particularly, the present invention relates to a recording and/or reproducing apparatus, which are provided for tape-shaped recording medium each made of a magnetic recording medium having an anisotropic property oblique with respect to the thickness direction.

In general, a linear tape streamer and a helical scan tape streamer are known as the conventional tape streamer. In a linear tape streamer, when data is recorded on a tape-shaped magnetic recording medium, an initial recording track parallel to the tape traveling direction (or the longitudinal direction) of the tape is created by using a fixed magnetic head. As the recording position arrives at one end of the tape, the traveling direction of the tape is reversed to record data along another track adjacent to the initial recording track and thereby forming a recording track. This operation is repeated alternately to record data onto the magnetic recording tape. Such a linear tape streamer conforms to a variety of formats such as the QIC (Quarter Inch Cartridge: a trademark), the DLT (Digital Linear Tape: a trademark) and the IBM 3480 (a trademark) provided by IBM.

In each of these linear magnetic recording apparatus, normally, an induction ring head is employed as a head for writing a signal onto a tape-shaped magnetic recording medium but, as a head for reading out a signal from the recording medium, the induction ring head or a magneto resistance effect head (an MR head) can be used. As the tape-shaped magnetic recording medium, a coated magnetic tape is used. Examples of the coated magnetic tape are an FeCoNi metallic alloy tape and an Fe-oxide tape with magnetic particles thereof oriented in the longitudinal direction.

A coated magnetic tape with its magnetism oriented in the longitudinal direction is used because, by orienting the magnetism uniformly in the same direction, the amount of residual magnetization and the aquareness ratio are improved so that the TAA (Time Average Amplitude) and spatial resolution PW (Pulse Width) 50 of a recording and/or reproducing signal are increased at the same time. Thus, the use of such a coated magnetic tape results in merits of an enhanced signal-to-noise ratio and, hence, an improved recording density. If a coated magnetic tape is used, the magnetism is oriented in the longitudinal direction. Therefore, a coated magnetic tape is used because there is no resulting difference in recording and reproducing characteristics between the two tape traveling directions when the magnetic tape is traveling back and forth.

In a helical scan tape streamer, on the other hand, a magnetic head is provided on a cylinder drum, which is rotating at a high speed. A tape-shaped magnetic recording medium is wound in an inclined direction on the cylinder drum. When the tape-shaped magnetic recording medium is traveling in one direction, data is recorded onto the magnetic recording medium. Such a helical scan tape streamer conforms to a variety of formats such as the DDS (Digital Data Storage) based on the DAT (Digital Audio Tape) technology, the AIT (Advance Intelligent Tape) based on an 8-mm video technology and the DTF (Digital Tape Format) based on a ½-inch tape technology developed for broadcasting stations.

In each of these helical scan tape streamers, a recording track is sequentially formed slantingly with respect to the traveling direction of the tape. That is to say, a signal is recorded in a one direction from the winding start of the tape to the winding end thereof but, unlike the linear tape streamer, back-and-forth recording is not carried out.

In recent years, there have been introduced helical scan tape streamers having formats for specially increasing the recording density. Examples of such formats are the AIT (Advance Intelligent Tape) format and the DVC (Digital Video Cassette) format for consumer applications. Such helical scan tape streamers each employ an evaporation tape, which has an oblique anisotropic property, as a tape-shaped magnetic recording medium. An evaporation tape is created by heating a ferromagnetic metal such as CoFe in a vacuum to a high temperature till the metal evaporates, directly forming a magnetic layer on a base film. Since such a tape does not include an organic binder, the magnetic material filling density is high, giving rise to an excellent magnetic characteristic and widely known possibility of recording operations at a high recording density.

An evaporation tape exhibits recording and/or reproducing characteristics varying in dependence on the direction, in which a magnetic head writes a signal onto the tape due to, among other causes, an oblique anisotropic property attributed to the actual mechanism of the magnetic material. For this reason, an evaporation tape is generally used only in one traveling direction resulting in a high spatial resolution PW50. This direction is normally referred to as a forward traveling direction. It is to be noted that the oblique anisotropic property is not a characteristic inherent only in an evaporation tape.

If an oriented magnetic field is applied in the traversal direction of a coated magnetic tape after an oriented magnetic field has been once applied in the longitudinal direction of the tape, for example, the tape will exhibit an oblique anisotropic property, which allows the recording and/or reproducing characteristics of a short-wave signal to be improved. However, differences in recording and/or reproducing characteristics between the traveling directions, that is, between forward and reversed directions, have been reported in a document with a title of "Metal Tapes for High-Band 8 mm" authored by Tsukidate et al. and presented to a national conference of the Institute of Television Engineers in the year of 1989.

If a tape-shaped magnetic recording medium is used in a helical scan tape streamer, the oblique anisotropic property of the tape-shaped magnetic recording medium raises no big problems because the tape can be transferred in such a way that a signal is recorded in one direction from the winding start of the tape to the winding end thereof as described above, that is, in only the forward direction, which exhibits an excellent magnetic conversion characteristic.

If a tape-shaped magnetic recording medium is used in a linear tape streamer, however, back-and-forth recording operations must be carried out. The magnetic conversion characteristic in the reversed direction, which is a direction not used in a helical scan tape streamer, is also required to almost the same degree as the forward direction. Thus, it is extremely difficult to improve the recording density in a linear tape streamer using a magnetic recording medium having an oblique anisotropic property.

In order to solve the problem described above, there has been reported an experiment to eliminate the differences in recording and reproducing characteristics between the forward and reversed directions by, typically, forming two magnetic layers on the magnetic recording medium and making the orientation of the anisotropic property on one of the magnetic layers opposite to the orientation of the anisotropic property on the other magnetic layer. The experiment is disclosed in references such as a document authored by Himeno et al. with a title of "Recording Signals on a Magnetic Tape Having a High Recording Density by Adoption of a Non-Tracking Method" in a magazine of the Institute of Electronic and Communication Engineers C-II Vol. J75-C-II No. 11 1992 and Japanese Patent Laid-open No. Hei 11-328645. In accordance with this magnetic recording method, however, the magnetic recording medium has a two-layer structure comprising two magnetic layers, that is, an upper layer and a lower layer wherein the orientation of the anisotropic property on one of the magnetic layers is opposite to the orientation of the anisotropic property on the other magnetic layer. Thus, there is raised a problem that it is feared that the recording and reproducing characteristics, particularly, the spatial resolution (PW50) unavoidably deteriorate so that the process to manufacture the magnetic recording medium inevitably becomes complicated, causing poorer producibility of the recording medium.

In consequence, the linear tape streamer has a problem that it is extremely difficult to increase the recording density by using a magnetic recording medium exhibiting an oblique anisotropic property.

In order to solve this problem, Japanese Patent Laid-open No. Hei 5-67374 proposes an improvement of a reproducing characteristic by varying coefficients of an equivalent circuit for a reproducing apparatus in which there are different tape traveling directions. An attempt has also been made to eliminate differences in recording and reproducing characteristics between the forward and reversed directions by forming two magnetic layers on the magnetic recording medium and making the orientation of the anisotropic property on one of the magnetic layers opposite to the orientation of the anisotropic property on the other magnetic layer.

While Japanese Patent Laid-open No. Hei 5-67374 shows a general design example of a gain-frequency characteristic used as a characteristic of an waveform equalizer, an object of design of the equalizer with respect to variations in magnetic conversion system, particularly, a detailed description and an object of design of a phase frequency characteristic is not described in concrete terms. In accordance with results of intensive researches conducted one after another on recording and/or reproducing apparatus using a recording medium having an oblique anisotropic property by the inventors of the present invention, there is a big difference in phase between the traveling directions of a tape-shaped magnetic recording medium having an oblique anisotropic property. For this reason, it is quite within the bounds of possibility that a sufficient characteristic cannot be obtained even if coefficients of the equivalent circuit are changed in accordance with the general design example unless the phase equalization is also taken into consideration in addition to the waveform equalization as described in Japanese Patent Laid-open No. Hei 5-67374. If the phase equalization is not carried out in an analog equalizer in every direction, it is quite within the bounds of possibility that the operation of a PLL (Phase Locked Loop) employed in an ADC (Analog-to-Digital Converter) hardly works.

While Japanese Patent Laid-open No. Hei 5-67374 discloses a data reproducing apparatus carrying out an adaptive equalization process, consideration of a characteristic of a recording medium having an oblique anisotropic property at a recording time is not described.

SUMMARY OF THE INVENTION

It is an object of the present invention to provide a recording and/or reproducing apparatus of a tape-shaped magnetic recording medium which resolves the above mentioned problem.

According to the present invention, there is provided a recording apparatus of a tape-shaped magnetic recording medium including a transfer unit, a recording head, a signal-processing unit and a control unit. The transfer unit transfers a tape-shaped magnetic recording medium, which has an anisotropic property oblique with respect to the thickness direction, in the forward or reversed direction. The recording head is positioned in such a way that a recording track is formed on the transferring tape-shaped magnetic recording medium, which is transferred by the transfer unit, in a direction parallel to the traveling direction of the tape-shaped magnetic recording medium. Connected to the recording head, the signal-processing unit receives a signal to be recorded onto the tape-shaped magnetic recording medium. The signal-processing unit then carries out signal processing required for an operation to write the signal to be recorded onto the tape-shaped magnetic recording medium. The control unit controls at least the operation of the signal-processing unit and detects the traveling direction of the tape-shaped magnetic recording medium transferred by the transfer unit, controlling the transfer unit on the basis of a result of detection.

According to the present invention, there is provided a reproducing apparatus of a tape-shaped magnetic recording medium including a transfer unit, a reproducing head, a signal-processing unit and a control unit. The transfer unit transfers a tape-shaped magnetic recording medium, which has an anisotropic property oblique with respect to the thickness direction, in the forward or reversed direction. The reproducing head scans a recording track formed on the traveling tape-shaped magnetic recording medium, which is transferred by the transfer unit, in a direction parallel to the transfer direction of the tape-shaped magnetic recording medium. The signal-processing unit receives an output signal read out by the reproducing head from the tape-shaped magnetic recording medium. The signal-processing unit then carries out signal processing, which is required for a reproducing operation, on the output signal. The control unit controls at least the operation of the signal-processing unit and detects the transfer direction of the tape-shaped magnetic recording medium transferred by the transfer unit, controlling the transfer unit on the basis of a result of detection.

According to the present invention, there is provided a recording and reproducing apparatus of a tape-shaped magnetic recording medium including a transfer unit, a recording and/or reproducing head, a signal-processing unit and a control unit. The transfer unit transfers a tape-shaped magnetic recording medium, which has an anisotropic property oblique with respect to the thickness direction, in the forward or reversed direction. The recording and/or reproducing head is positioned in such a way that a recording track is formed on the traveling tape-shaped magnetic recording medium, which is transferred by the transfer unit, in a direction parallel to the transfer direction of the tape-shaped magnetic recording medium. The recording and/or reproducing head scans a recording track formed on the traveling tape-shaped magnetic recording medium. Connected to the recording and/or reproducing head, the signal-processing unit receives a signal to be recorded onto the tape-shaped magnetic recording medium. The signal-processing unit then carries out signal processing required for an operation to write the signal to be recorded onto the tape-shaped magnetic recording medium. The signal-processing unit also receives an output signal read out by the recording and/or reproducing head from the tape-shaped magnetic recording medium. The signal-processing unit then carries out signal process, which is required for a reproducing operation, on the output signal. The control unit controls at least the operation of the signal-processing unit and detects the transfer direction of the tape-shaped magnetic recording medium transferred by the transfer unit, controlling the transfer unit on the basis of a result of detection.

BRIEF DESCRIPTION OF THE DRAWINGS

FIG. 6 is a diagram showing recording and reproducing conditions;

FIG. 13 is a diagram showing a typical operation to record a signal onto an evaporation tape in the forward direction;

FIG. 14 is a diagram showing a typical operation to record a signal onto an evaporation tape in the reversed direction;

FIG. 15 is a diagram showing characteristics each representing a relation between the TAA and the recording current;

FIG. 17 is a diagram showing the waveform of a signal reproduced from an evaporation tape in the forward direction;

FIG. 18 is a diagram showing the waveform of a signal reproduced from an evaporation tape in the forward direction;

DETAILED DESCRIPTION OF THE INVENTION

Figure 1:
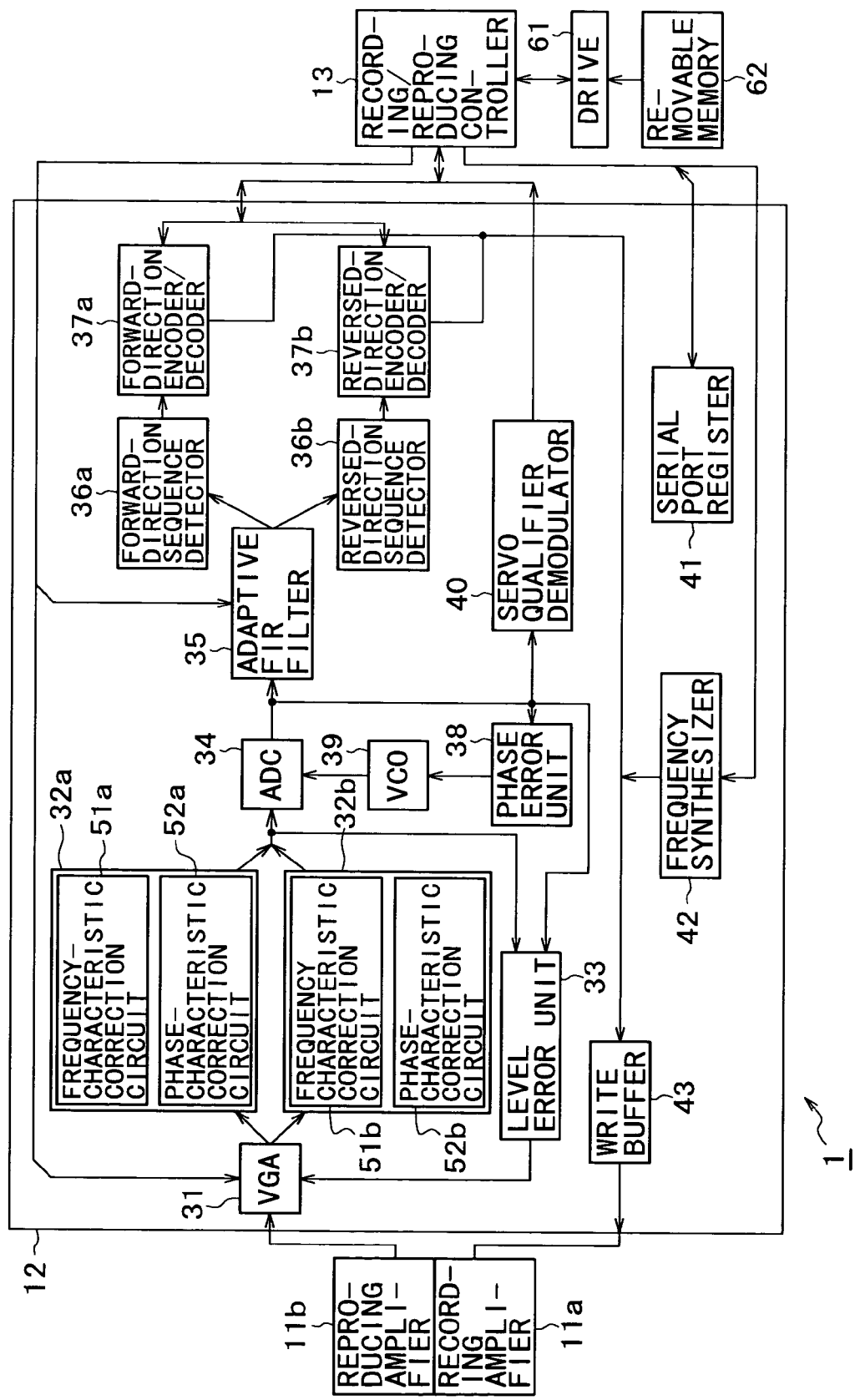
FIG. 1 is a block diagram showing the configuration of an embodiment implementing a tape streamer provided by the present invention.

Embodiments of the present invention are described by referring to the diagrams as follows. FIG. 1 is a block diagram showing the configuration of an embodiment implementing a tape streamer 1 provided by the present invention. A reproducing amplifier 11b is connected to a fixed reproducing head, which is not shown in the figure. On the other hand, a recording amplifier 11a is connected to a fixed recording head also not shown in the figure. A recording and reproducing circuit 12 is provided between the recording amplifier 11a and a recording and reproducing controller 13 as well as between the reproducing amplifier 11b and the recording and reproducing controller 13.

When a VGA (Variable Gain Amplifier) 31 receives a reproduced signal, which is generated from a magnetic tape not shown in the figure, from the reproducing amplifier 11b, the VGA 31 amplifies the signal and outputs the amplified signal. When the reproduced signal is generated from the magnetic tape while the tape is traveling in the forward direction, the recording and reproducing controller 13 supplies the reproduced signal output by the VGA 31 to a forward-direction analog equalizer 32a. When the reproduced signal is generated from the magnetic tape while the tape is traveling in the reversed direction, on the other hand, the recording and reproducing controller 13 supplies the reproduced signal output by the VGA 31 to a reversed-direction analog equalizer 32b.

The forward-direction analog equalizer 32a comprises a frequency-characteristic correction circuit 51a and a phase-characteristic correction circuit 52a. By the same token, the reversed-direction analog equalizer 32b comprises a frequency-characteristic correction circuit 51b and a phase-characteristic correction circuit 52b.

A reproduced signal supplied to the forward-direction analog equalizer 32a or the reversed-direction analog equalizer 32b is subjected to a waveform equalization process. To put it in detail, the frequency-characteristic correction circuit 51a or 51b corrects the frequency characteristic of the reproduced signal. On the other hand, the phase-characteristic correction circuit 52a or 52b corrects the phase characteristic of the reproduced signal. The reproduced signal completing the waveform equalization process is then supplied to an ADC (Analog/Digital Converter) 34.

A phase error unit 38 detects a phase error between a reference clock signal and the reproduced signal received from the ADC 34, supplying information on the phase error to a VCO (Voltage Controlled Oscillator) 39. The VCO 39 generates a clock signal corresponding to the phase error on the basis of the information and supplies the ADC 34 with the clock signal. The ADC 34 subjects the reproduced signal to analog-to-digital conversion on the basis of the supplied clock signal. The ADC 34, the phase error unit 38 and the VCO 39 form a PLL (Phase Locked Loop).

A level error unit 33 detects an error in amplitude between a signal output by the forward-direction analog equalizer 32a or the reversed-direction analog equalizer 32b and a signal output by the ADC 34, and thereby controlling the gain of the VGA 31 on the basis of the error.

The digital reproduced signal obtained as a result of an analog-to-digital conversion process carried out by the ADC 34 is supplied to an adaptive FIR filter 35 for removing unnecessary frequency band components from the signal.

A recording and reproducing controller 13 controls the adaptive FIR filter 35 so that, if the reproduced signal is a signal generated from the magnetic tape while the tape is traveling in the forward direction, the reproduced signal output by the adaptive FIR filter 35 is supplied to a forward-direction sequence detector 36a but, if the reproduced signal is a signal generated from the magnetic tape while the tape is traveling in the reversed direction, on the other hand, the reproduced signal output by the adaptive FIR filter 35 is supplied to a reversed-direction sequence detector 36b. The forward-direction sequence detector 36a or the reversed-direction sequence detector 36b detects a recording sequence from the waveform of respectively the forward or reversed-direction reproduced signal, which has been subjected to a digital equalization process in the adaptive FIR filter 35. A reproduced signal output by the forward-direction sequence detector 36a or the reversed-direction sequence detector 36b is supplied to a forward-direction encoder/decoder 37a or a reversed-direction encoder/decoder 37b respectively for decoding the signal before outputting a signal obtained as a result of decoding to the recording and reproducing controller 13.

A servo qualifier demodulator 40 detects and demodulates a servo component from the signal output by the ADC 34, outputting a result of demodulation to the recording and reproducing controller 13. By a servo component, servo sector information is meant.

If the magnetic tape is traveling in the forward direction, the recording and reproducing controller 13 supplies a signal to be recorded to the forward-direction encoder/decoder 37a. If the magnetic tape is traveling in the reversed direction, on the other hand, the recording and reproducing controller 13 supplies a signal to be recorded to the reversed-direction encoder/decoder 37b. The forward-direction encoder/decoder 37a or the reversed-direction encoder/decoder 37b encodes the received signal to be recorded and supplies the encoded signal to the recording amplifier 11a by way of the write buffer 43.

A frequency synthesizer 42 generates a clock signal used for processing a signal to be recorded. A serial port register 41 is a register for storing an input command used by an external apparatus such as a personal computer to control a read channel.

If necessary, the recording and reproducing controller 13 is connected to a drive 61 for writing and reading out data onto and from another recording medium such as a removable memory 62.

A magnetic recording and reproducing program to be executed for controlling the tape streamer 1 to carry out predetermined operations is supplied to the tape streamer 1 in a state of being stored in the removable memory 62 in advance. The drive 61 reads out the magnetic recording and reproducing program from the removable memory 62 and installs the program in an internal memory employed in the recording and reproducing controller 13.

In the tape streamer 1, a tape-driving mechanism drives the evaporation tape to travel in the forward or reversed direction, allowing data to be recorded or reproduced onto or from the tape.

Figure 2:
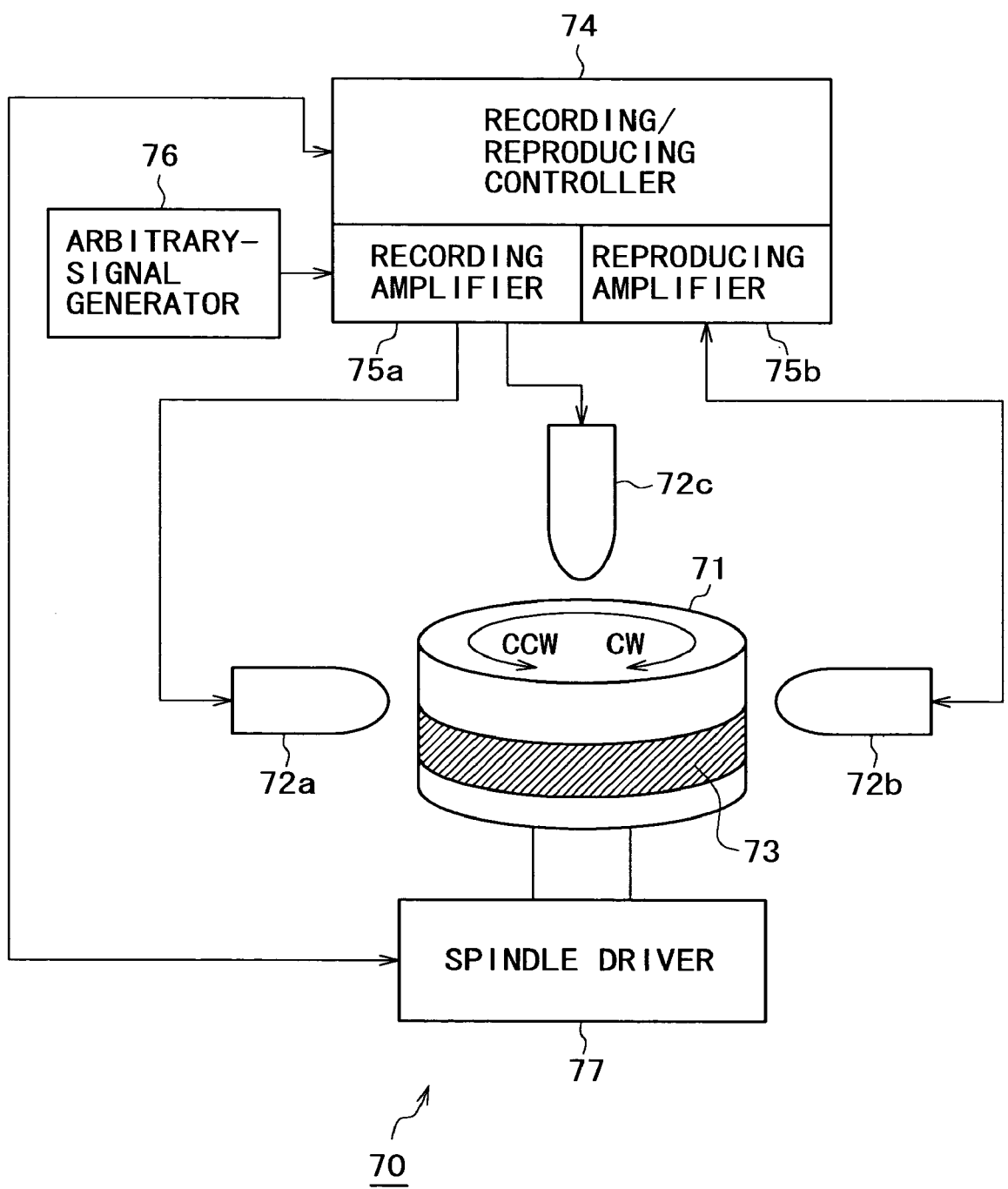
FIG. 2 is a diagram showing the configuration of a test apparatus for testing the magnetic recording characteristic of a magnetic tape.

A test apparatus 70 shown in FIG. 2 is used for testing the magnetic recording characteristic of the magnetic tape 73.

In the test apparatus 70 shown in FIG. 2, the magnetic tape 73 is wound around a rotating drum 71. As the magnetic tape 73, typically, an evaporation tape is used. It is to be noted that the present invention is well applicable to a reproducing apparatus for a tape-shaped recording medium having an anisotropic property oblique with respect to the thickness direction, and an evaporation tape is a kind of such tape-shaped recording medium.

In the test apparatus 70, as described above, the magnetic tape 73 is wound around the rotating drum 71 and a magnetic head is provided at a position facing the magnetic tape 73. The magnetic head comprises a recording head 72a, a reproducing head 72b and an erase head 72c. As the recording head 72a, the reproducing head 72b and the erasure head 72c, it is desirable to use heads having characteristics equivalent to their respective counterpart configuration elements employed in the tape streamer 1 provided by the present invention. In this case, for example, an MIG (Metal in Gap) head of a magnetic flux induction type is employed as the recording head 72a and an MR (Magneto Resistance) head of a magneto resistance effect type is employed as the reproducing head 72b. It is to be noted that the recording head 72a and the reproducing head 72b are installed on an adjustable and movable stage that can be moved in the X, Y and Z directions and whose attributes such as a gate, swinging movements and an azimuth angle can be adjusted so that it is possible to bring the recording head 72a and the reproducing head 72b in optimum contact with the magnetic tape 73. Note that the adjustable and movable stage itself is not shown in the figure.

A spindle driver 77 controls the rotational directions and rotational speed of the rotating drum 71. The rotational directions are the forward direction or the CW (clockwise) direction and the reversed direction or the CCW (counterclockwise) direction. The spindle driver 77 is connected to the rotating drum 71 and a recording and reproducing controller 74 for issuing a command to control the rotating drum 71. The recording and reproducing controller 74 is connected to a recording amplifier 75a for driving the recording head 72a or the erasure head 72c and a reproducing amplifier 75b for driving the reproducing head 72b. The recording amplifier 75a is connected to an arbitrary-signal generator 76 for generating a test signal.

In a recording operation, the recording and reproducing controller 74 receives an arbitrary signal (recording data) to be recorded from an arbitrary-signal generator 76 and supplies the signal to a recording amplifier 75a. The recording amplifier 75a amplifies the signal before supplying the signal to the recording head 72a for recording the signal onto the magnetic tape 73. At that time, the recording and reproducing controller 74 controls the recording amplifier 75a to set a recording current Iw at a predetermined value.

Also at that time, the recording and reproducing controller 74 controls the spindle driver 77 to move the magnetic tape 73, which is wound around the rotating drum 71, at a predetermined speed in the forward or reversed direction. Thus, the data is recorded onto the magnetic tape 73 at the predetermined speed along a specific recording track parallel to the longitudinal direction of the magnetic tape 73. As the recording position reaches the end of the tape, the traveling direction is reversed from the forward direction to the reversed direction or from the reversed direction to the forward direction. The operation to record the data is then continued to another recording track adjacent to the specific recording track.

In a reproducing operation, on the other hand, the reproducing head 72b reproduces data from the magnetic tape 73 by using a reproducing sense current Is according to a command issued by the recording and reproducing controller 74. At that time, the magnetic tape 73 is traveling at a predetermined speed in the forward or reversed direction as is the case with the recording operation, allowing data to be reproduced from a desired location on the magnetic tape 73. A reproduced signal output by the reproducing head 72b is amplified by the reproducing amplifier 75b before being supplied to the recording and reproducing controller 74.

In addition, the recording and reproducing controller 74 may issue an erase command to control the erasure head 72c so as to erase data from the magnetic tape 73. Also in this case, the magnetic tape 73 is traveling at a predetermined speed in the forward or reversed direction, allowing the data to be erased from a desired location on the magnetic tape 73.

Figure 3:
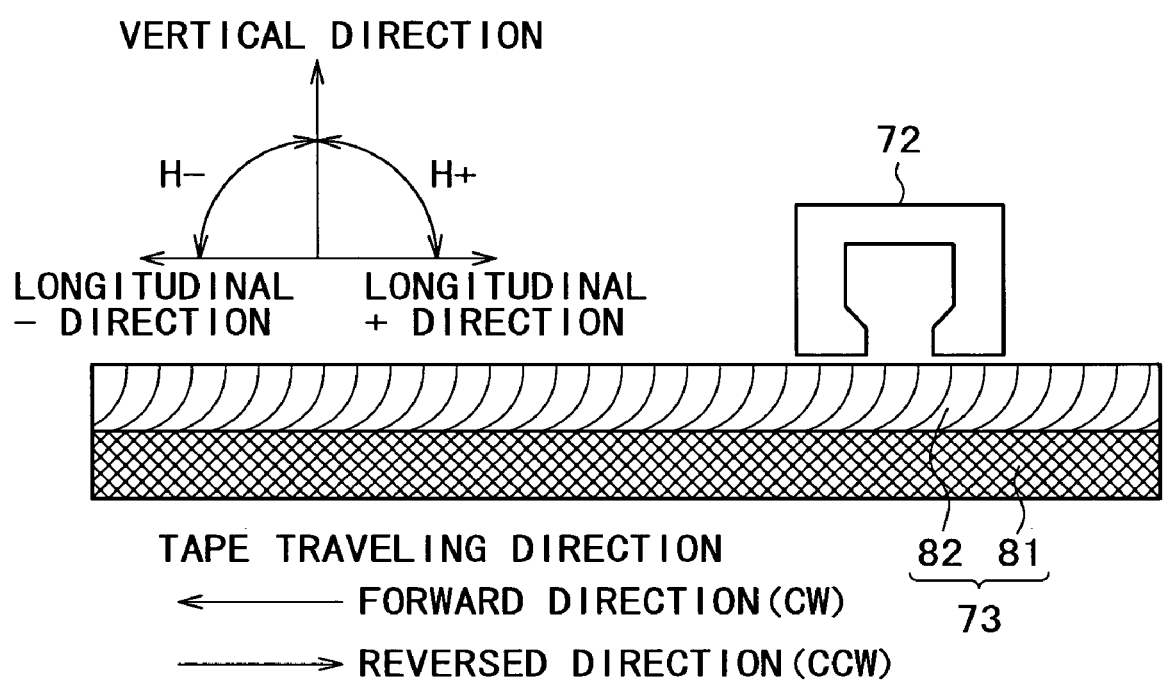
FIG. 3 is a diagram showing the configuration of a magnetic tape.
Figure 4:
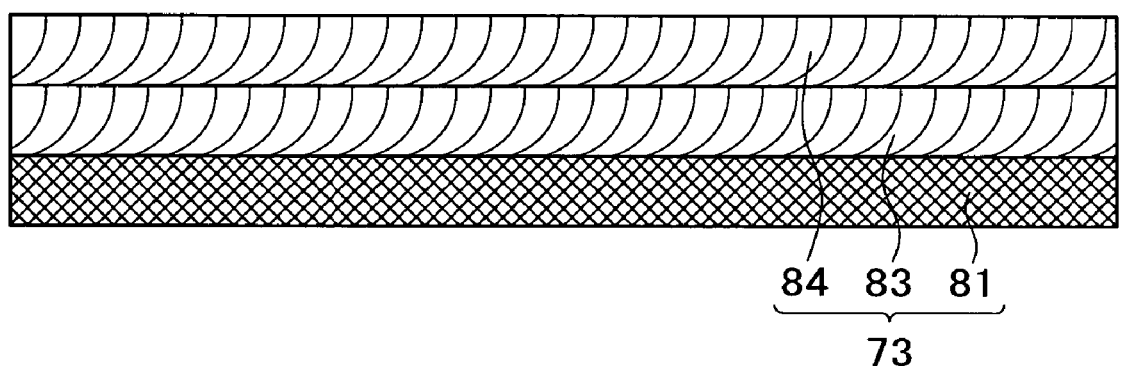
FIG. 4 is a diagram showing the configuration of a magnetic tape.
Figure 5:
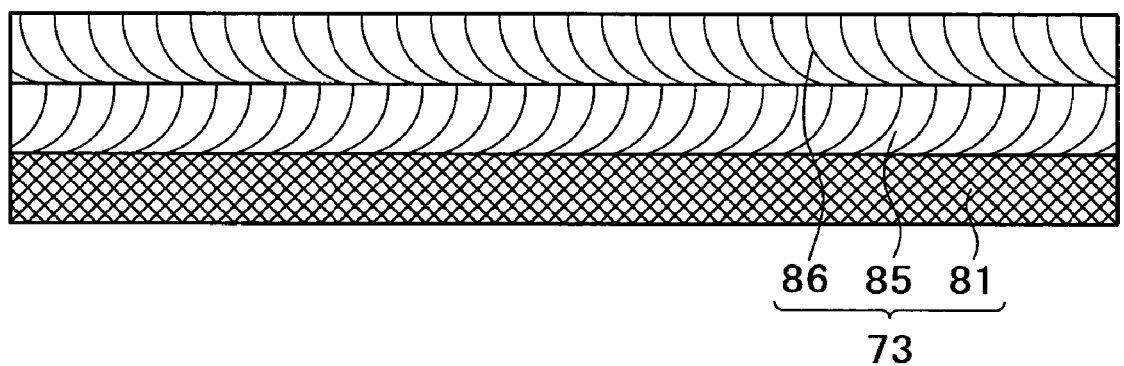
FIG. 5 is a diagram showing the configuration of a magnetic tape.

Configurations of the magnetic tape 73 are shown in FIGS. 3 to 5. As shown in FIG. 3, the magnetic tape 73 includes an oblique deposition magnetic layer 82 made from a material of the cobalt group to form pillar-shaped structures on a non-magnetic support base 81. A magnetization easy axis exists between the vertical direction and the longitudinal+direction, which is the direction to the right side in FIG. 3. It is to be noted that lines in the oblique deposition magnetic layer 82 made from a material of the cobalt group show the formation direction of columns. As shown in FIG. 3, each of the columns is created in an oblique direction.

When the magnetic tape 73 is traveling back and forth with respect to the fixed heads 72 such as the recording head 72a, the reproducing head 72b and the erasure head 72c, a signal is recorded onto or reproduced from the magnetic tape 73. It is to be noted that, in FIG. 3, the direction to the left is the forward (CW) traveling direction of the magnetic tape 73 whereas the direction to the right is the reversed (CCW) traveling direction of the magnetic tape 73.

As shown in FIG. 4, the magnetic tape 73 includes a two-layer structure created on a non-magnetic support base 81. The two-layer structure comprises magnetic layers 83 and 84, which are created so that the column formation directions (the oblique directions of the magnetization easy axes) of the magnetic layers 83 and 84 are aligned to each other.

As an alternative, the magnetic tape 73 includes a two-layer structure created on a non-magnetic support base 81 but the two-layer structure comprises magnetic layers 85 and 86, which are created so that the column formation directions of the magnetic layers 85 and 86 are opposite to each other as shown in FIG. 5. That is to say, the column formation direction of the magnetic layer 85 is the H+ direction while the column formation direction of the magnetic layer 86 is the H− direction in this case.

By using the magnetic tape 73 like the one shown in FIG. 3 as an example, the following description exemplifies the characteristic of the magnetic tape 73. The characteristic is observed in operations carried out by the test apparatus 70 to record and reproduce a signal.

Recording and reproducing conditions set for examination of the characteristic of the magnetic tape 73 are shown in FIG. 6. In an ordinary room state, that is, at a temperature of 25° C. and a humidity of 60%, the rotating drum 71 was rotating at a revolution speed of 1,300 rpm in the forward (CW) and reversed (CCW) directions. The magnetic tape 73 was a thin-layer cobalt oblique evaporation tape like the one shown in FIG. 3. The magnetic tape 73 had an Hc value of 105 kA/m and an Mr.t value of 1.6 memu/cc. The recording head 72a was an MIG head with a track width of 12 μm and an effective gap of 0.21 μm. On the other hand, the reproducing head 72b was an MR head with a device track width of 9 μm and an inter-shield gap length of 0.23 μm. The head/tape phase relative speed was 6.8 m/s. The measurement-time recording frequency of the solitary wave half band width (PW50) and the measurement-time recording frequency of the solitary wave output (IS TAA) were 1 MHz.

Figure 7:
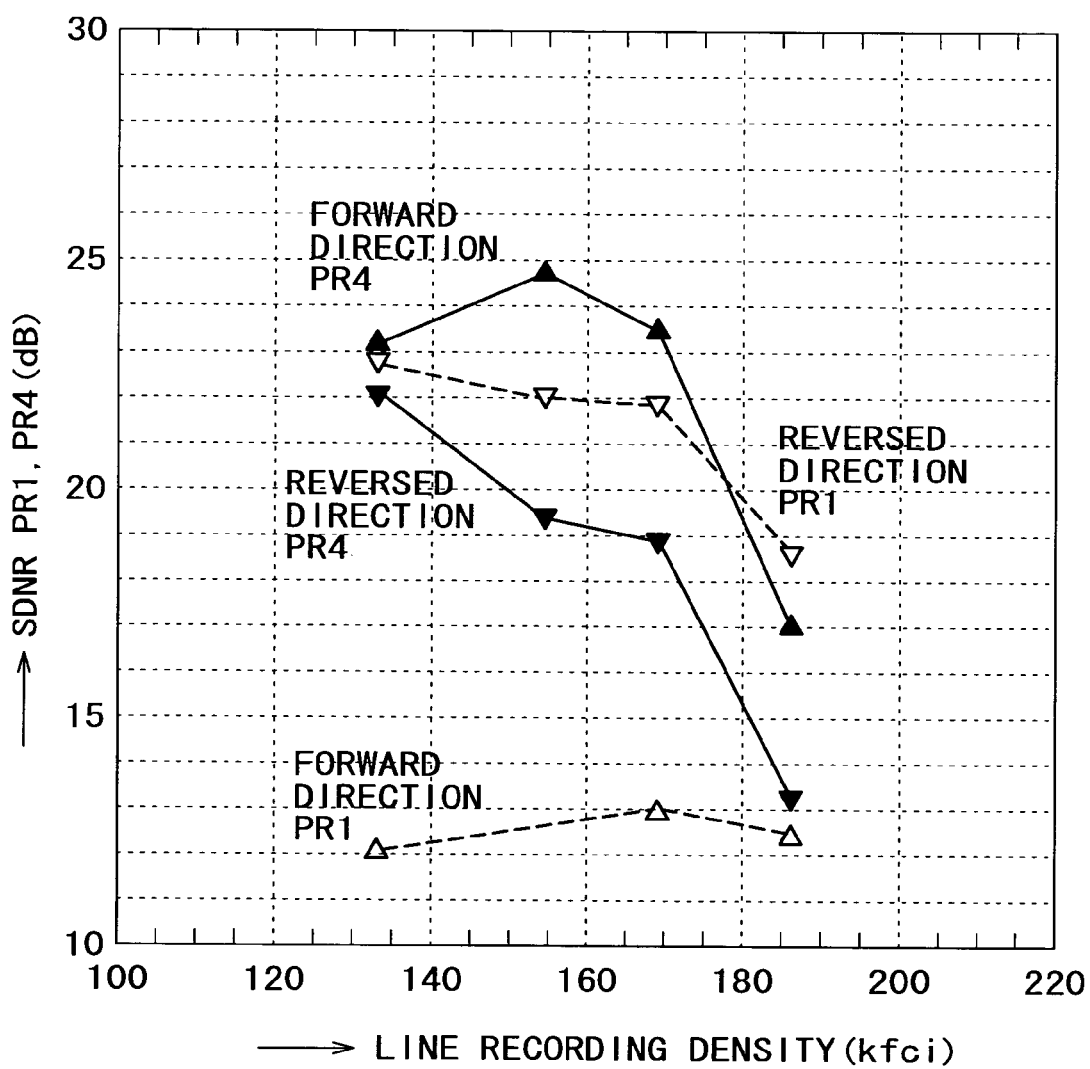
FIG. 7 is a diagram showing characteristics each representing a relation between a line recording density and an SDNR for sufficiently small TA noises.

FIG. 7 is a diagram showing characteristics each representing a relation between a line recording density and a SDNR (Signal-to-Distortion and Noise Ratio) after waveform equalization for a magnetic tape 73 with small TA (Thermal Asperity) noises to be described later. The characteristics are dependent on the traveling direction of the magnetic tape 73. It is to be noted that the recording and reproducing conditions for this test are shown in FIG. 6. As equalization methods for finding the SDNR, PR1 (Partial Response Class 1) and PR4 (Partial Response Class 4) methods were adopted. In FIG. 7, solid lines each represent a PR4 characteristic and dashed lines each represent a PR1 characteristic.

The magnetic tape 73 with data recorded in the reversed direction has a wide PW50 (refer to FIG. 16 described later) in comparison with the forward direction and exhibits a frequency characteristic of an emphasized long-wave type. Such a reversed-direction magnetic tape 73 has values of the SDNR after PR1 optimum equalization greater than the values of the SDNR after PR4 optimum equalization for all line recording densities as is obvious from FIG. 7. On the other hand, the magnetic tape 73 with data recorded in the forward direction has a narrow PW50 in comparison with the reversed direction and exhibits a frequency characteristic of an emphasized short-wave type. Such a forward-direction magnetic tape 73 has values of the SDNR after PR4 optimum equalization greater than the values of the SDNR after PR1 optimum equalization for all line recording densities as is obvious from the figure.

When a magnetic recording system capable of sustaining sufficient reliability of recording and reproducing operations at an SDNR of 22 dB is used, for example, as the equalization method, the PR4 and PR1 methods are adopted for the forward and reversed directions respectively. In this way, a signal can be recorded at a line recording density of about 170 kfci in both the directions.

Figure 8:
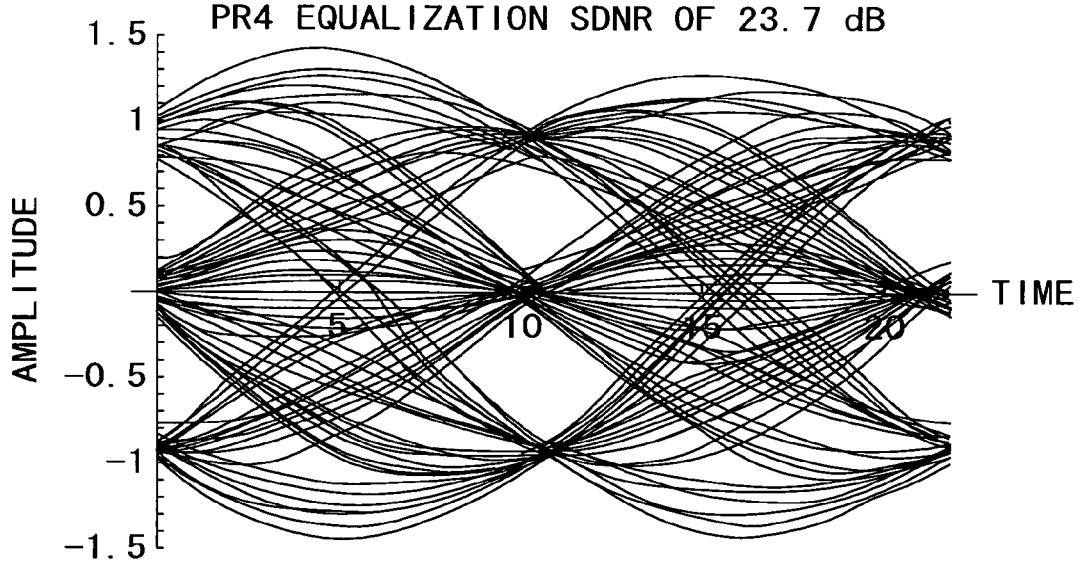
FIG. 8 is a diagram showing an eye pattern for PR4 equalization of a signal reproduced from a tape traveling in the forward direction.

FIG. 8 is a diagram showing an eye pattern for PR4 equalization of a signal reproduced from the magnetic tape 73 having a recording density of 170 kfci and traveling in the forward direction. On the other hand, FIG. 9 is a diagram showing an eye pattern for PR1 equalization of a signal reproduced from the magnetic tape 73 having a recording density of 170 kfci and traveling in the reversed direction.

Figure 9:
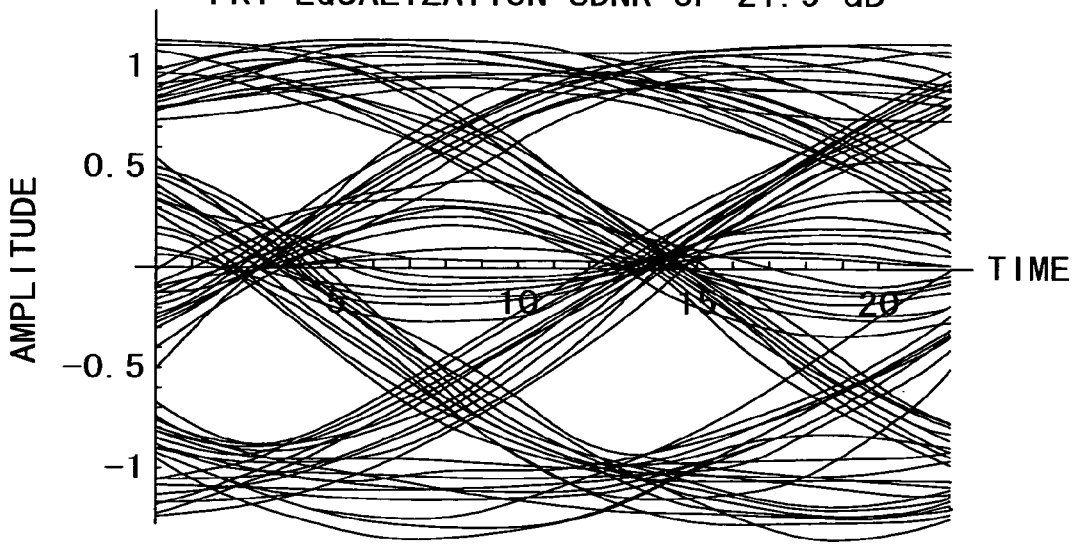
FIG. 9 is a diagram showing an eye pattern for PR1 equalization of a signal reproduced from a tape traveling in the reversed direction.

The SDNR values shown in FIG. 9 for a signal recorded in the reversed direction are small in comparison with those shown in FIG. 8. By adoption of PR1 as an equalization method, however, an eye pattern with an SDNR of about 22 dB is obtained.

Next, TA noises in the PR1 and PR4 equalization methods are explained. It has been known that, if an MR head is used as the reproducing head 72b, due to heat generated by contact between the MR device and the recording medium, which is the magnetic tape 73 in this case, the device resistance changes, resulting in generation of TA noises.

A TA noise is generated in a region of a relatively large wavelength or a relatively low frequency. Thus, if an equalization method such as PR1 requiring a long-wave component is adopted, TA noises generated in the long-wave region have an effect on the SDNR, making the SDNR poorer. If an equalization method such as PR4 requiring a short-wave (high-frequency) component is adopted, on the other hand, the generation of TA noises does not have a big effect on the SDNR.

Figure 10:
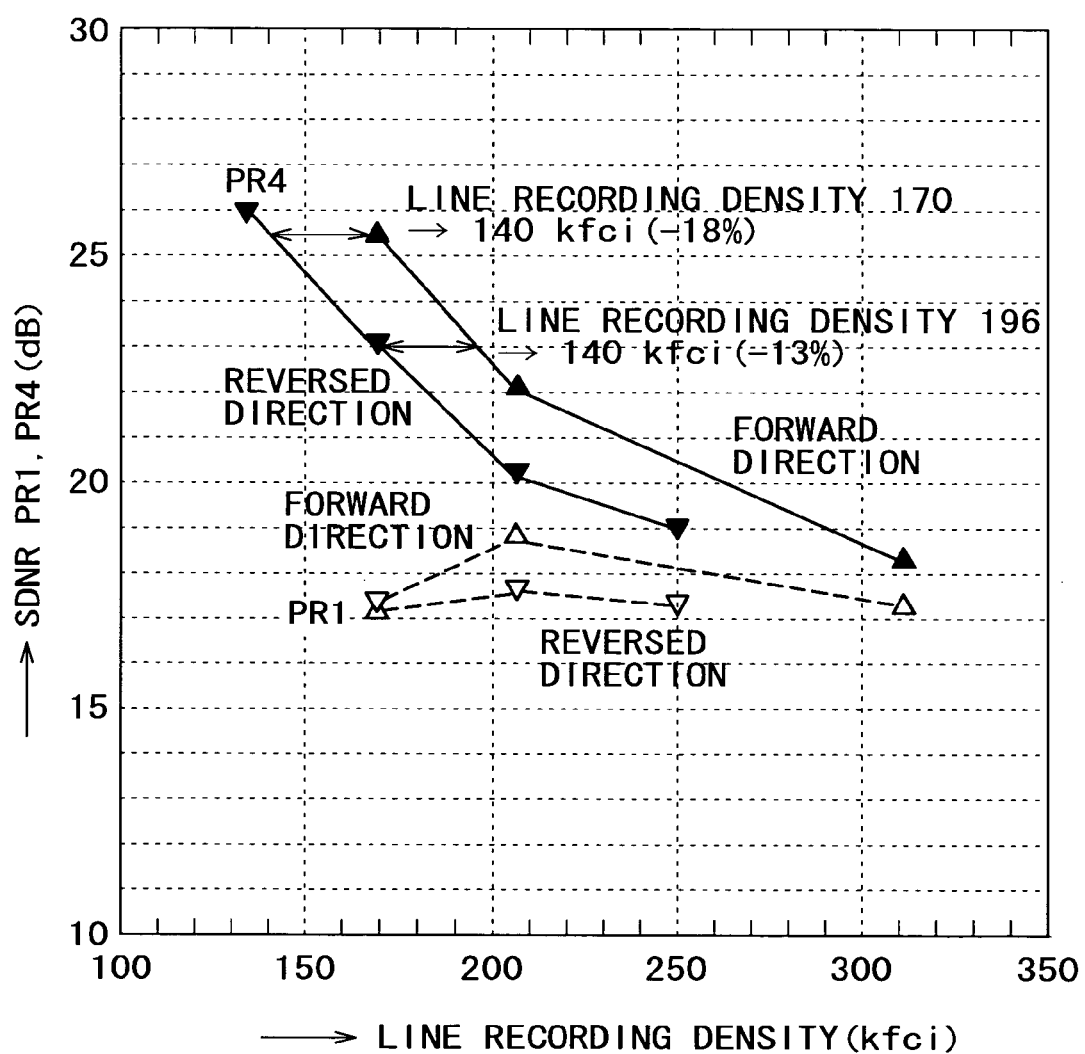
FIG. 10 is a diagram showing characteristics each representing a relation between a line recording density and an SDNR for large TA noises.

FIG. 10 is a diagram showing characteristics each representing a relation between a line recording density and the SDNR of signals recorded on a magnetic tape with large TA noises by adoption of the PR1 and PR4 equalization methods in the forward and reversed directions. It is to be noted that the conditions shown in FIG. 6 were applied as the recording and reproducing conditions.

Compare the SDNR after PR4 optimum equalization in the forward direction with the SDNR after PR4 optimum equalization in the reversed direction. In the recording density range 170 to 250 kfci, the SDNR after PR4 optimum equalization in the reversed direction is lower by about 1.5 to 2.5 dB than the SDNR after PR4 optimum equalization in the forward direction. The low values of the SDNR after PR4 optimum equalization in the reversed direction in comparison with those of the SDNR after PR4 optimum equalization in the forward direction are due to, among other causes, a difference in spatial resolution PW50, nonlinear distortions caused by a difference in waveform and an equalization error between the forward and reversed directions. In both the directions, the SDNR after PR4 optimum equalization is greater than the SDNR after PR1 optimum equalization over the entire line recording density range. These differences are attributed to effects of TA noises.

As is obvious from FIG. 10, in order to obtain an SDNR after PR4 optimum equalization in the reversed direction equivalent to an SDNR after PR4 optimum equalization in the forward direction, the line recording density of the signal in the reversed direction needs to be reduced to a value lower than the line recording density in the forward direction. In order to obtain an SDNR after PR4 optimum equalization in the reversed direction equivalent to an SDNR of 25.6 dB after PR4 optimum equalization in the forward direction at a line recording density of 170 kfci, for example, the line recording density in the reversed direction needs to be reduced by 18% to 140 kfci.

Figure 11:
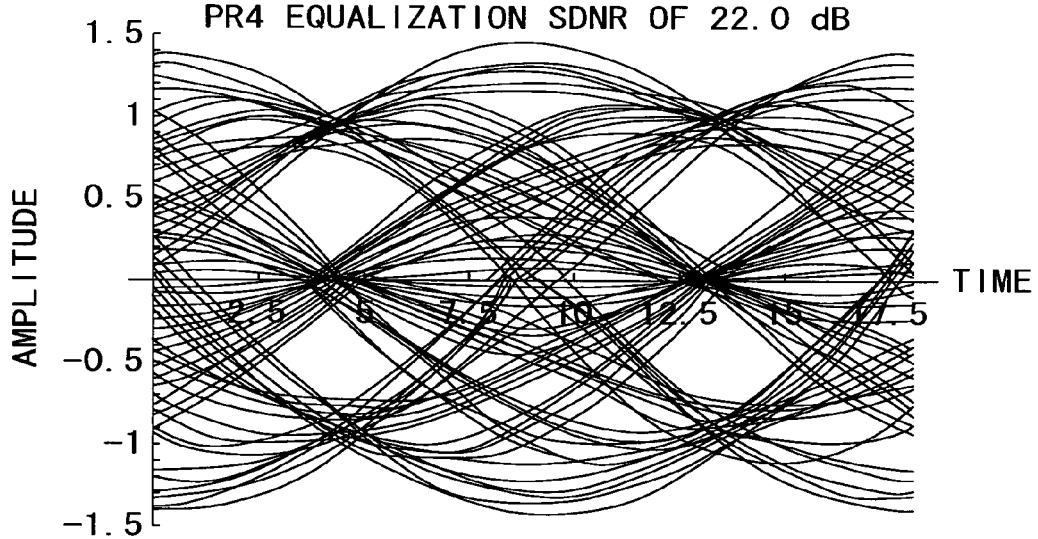
FIG. 11 is a diagram showing an eye pattern for PR4 equalization of a signal reproduced from a tape traveling in the forward direction.
Figure 12:
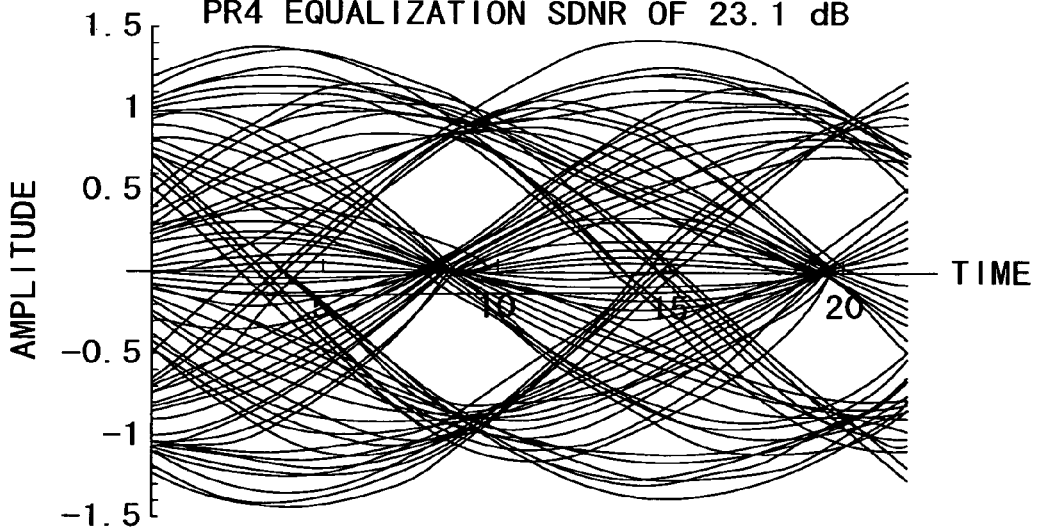
FIG. 12 is a diagram showing an eye pattern for PR1 equalization of a signal reproduced from a tape traveling in the reversed direction.

FIG. 11 is a diagram showing an eye pattern for PR4 optimum equalization of a signal at a line recording density of 207 kfci for a tape traveling in the forward direction. On the other hand, FIG. 12 is a diagram showing an eye pattern for PR4 optimum equalization of a signal at a line recording density of 170 kfci for a tape traveling in the reversed direction.

If the line recording density in the reversed direction is reduced from a line recording density of 207 kfci in the forward direction by 18% to 170 kfci, the SDNR in the reversed direction is improved to 23.1 dB, which is higher than an SDNR of 22.0 dB in the forward direction by +1.1 dB. That is to say, by reducing the line recording density in the reversed direction to a value lower than the line recording density in the forward direction, a difference in SDNR between the forward and reversed directions can be improved.

By referring to FIGS. 13 and 14, the following description explains differences in characteristics between the forward and reversed directions. By the characteristics, a relation between the TAA and the recording current as well as a relation between the PW50 and the recording current are implied. As described before, the TAA is an average output of a solitary reproduced wave (or the intensity of the recording and reproducing signal) whereas the PW50 is the waveform duration (or the spatial resolution) for a level, at which the TAA becomes 50%.

The recording head 72a is placed on the magnetic tape 73. As shown in FIG. 13, when a signal is recorded onto the magnetic tape 73 while the magnetic tape 73 is traveling in the forward direction, the direction of a magnetic field emanating from the trailing edge of the recording head 72a forms an angle all but close to a rectangle in conjunction with the anisotropy orientation of the layer 82 on the magnetic tape 73. In the figure, the magnetic field is represented by dashed lines, the trailing edge of the recording head 72a is the front edge and the anisotropy orientation is the direction of arrow H. As described earlier, the layer 82 is a layer made from a material of the cobalt group. Thus, the magnetization reversal width is small and a strong write magnetic field is required in spite of the fact that it is possible to reduce the effect of a phenomenon, in which a recording pattern written immediately before is erased. This phenomenon is referred to as recording demagnetization.

When a signal is recorded onto the magnetic tape 73 while the magnetic tape 73 is traveling in the reversed direction as shown in FIG. 14, on the other hand, the direction of the magnetic field emanating from the trailing edge of the recording head 72a and the anisotropy orientation of the layer 82 made from a material of the cobalt group on the magnetic tape 73 coincide with each other or are all but parallel to each other. Also in this case, in the figure, the magnetic field is represented by dashed lines and the anisotropy orientation is the direction of arrow H. Thus, write and erase operations are easy to carry out.

FIG. 15 is a diagram showing characteristics each representing a relation between the average output of a solitary reproduced wave (or the strength of the recording and reproducing signal) TAA and the recording current Iw. It is to be noted that the conditions shown in FIG. 6 were applied as the recording and reproducing conditions.

As shown in FIG. 15, when the recording current Iw is reduced, the TAA increases for both the forward and reversed directions. In the recording current range 20 to 35 mApp, the TAA for the reversed direction is greater than the TAA for the forward direction. That is to say, an operation to record a signal onto the magnetic tape 73 while the magnetic tape 73 is traveling in the reversed direction is easier to carry out than an operation to record a signal onto the magnetic tape 73 while the magnetic tape 73 is traveling in the forward direction.

Figure 16:
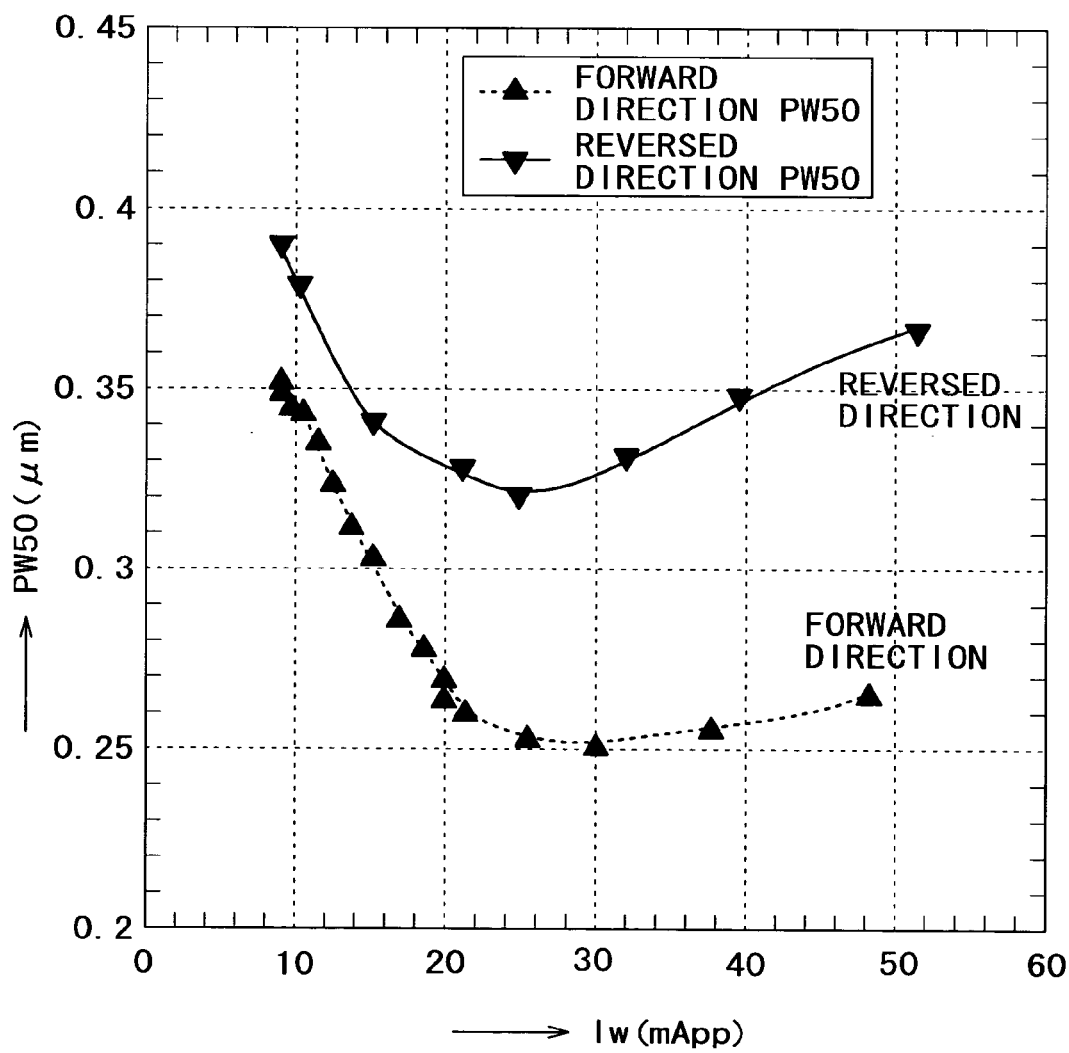
FIG. 16 is a diagram showing characteristics each representing a relation between the PW50 and the recording current.

FIG. 16 is a diagram showing characteristics each representing a relation between the waveform duration (or the spatial resolution) PW50 and the recording current Iw for a level at which the TAA becomes 50%. It is to be noted that the conditions shown in FIG. 6 were applied as the recording and reproducing conditions.

In the entire range of the recording current, the PW50 of the reversed direction is greater than the PW50 of the forward direction, that is, the waveform duration of the reversed direction is greater than the waveform duration of the forward direction. As described above, an operation to record a signal in the forward direction results in a small magnetization reversal width with respect to the PW50 in comparison with a recording operation carried out in the reversed operation. The recording current Iw resulting in a minimum PW50 for the reversed direction is smaller than the recording current Iw resulting in a minimum PW50 for the forward direction.

As such, if a signal is recorded in the reversed direction by flowing the same recording current Iw as that for the forward direction, the strength TAA of the recording and reproducing signal and the spatial resolution PW50 decrease. If a signal is recorded in the reversed direction by flowing the same recording current Iw as that for the forward direction, the intensity of the magnetic field is too large so that recording demagnetization occurs with ease. Thus, by recording a signal in the reversed direction by flowing a smaller recording current Iw than that for the forward direction, the strength TAA of the recording and reproducing signal and the spatial resolution PW50 for the reversed direction can each be brought to an optimum value.

Figure 19:
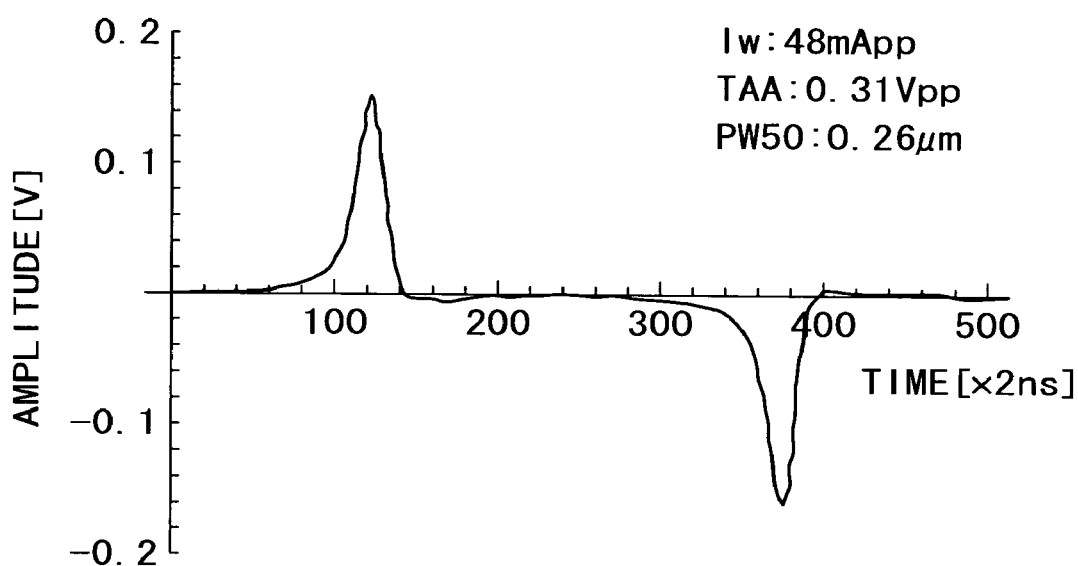
FIG. 19 is a diagram showing the waveform of a signal reproduced from an evaporation tape in the forward direction.

FIGS. 17 to 19 are each a diagram showing a solitary reproduced waveform of a signal to be recorded on the magnetic tape 73 traveling in the forward direction. It is to be noted that the conditions shown in FIG. 6 were applied as the recording and reproducing conditions.

To be more specific, FIG. 17 is a diagram showing a solitary reproduced waveform of a signal recorded onto the magnetic tape 73 by flowing a recording current Iw of 11 mApp. For this waveform, the strength TAA of the recording and reproducing signal is 0.29 Vpp and the spatial resolution PW50 is 0.34 µm. FIG. 18 is a diagram showing a solitary reproduced waveform of a signal recorded onto the magnetic tape 73 by flowing a recording current Iw of 30 mApp. For this waveform, the strength TAA of the recording and reproducing signal is 0.32 Vpp and the spatial resolution PW50 is 0.25 µm. FIG. 19 is a diagram showing a solitary reproduced waveform of a signal recorded onto the magnetic tape 73 by flowing a recording current Iw of 48 µmApp. For this waveform, the strength TAA of the recording and reproducing signal is 0.31 Vpp and the spatial resolution PW50 is 0.26 µm.

Figure 20:
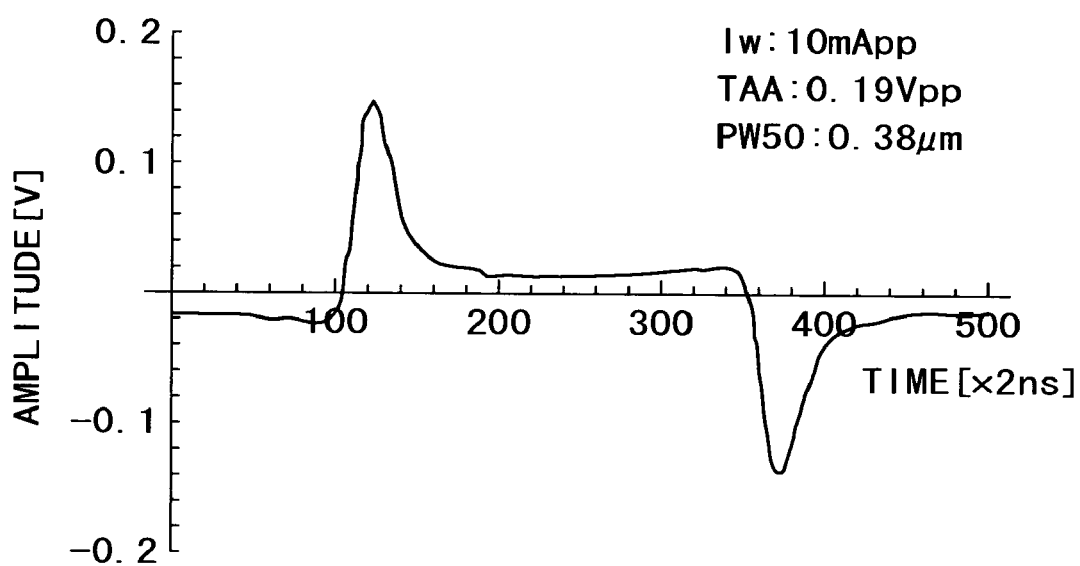
FIG. 20 is a diagram showing the waveform of a signal reproduced from an evaporation tape in the reversed direction.
Figure 21:
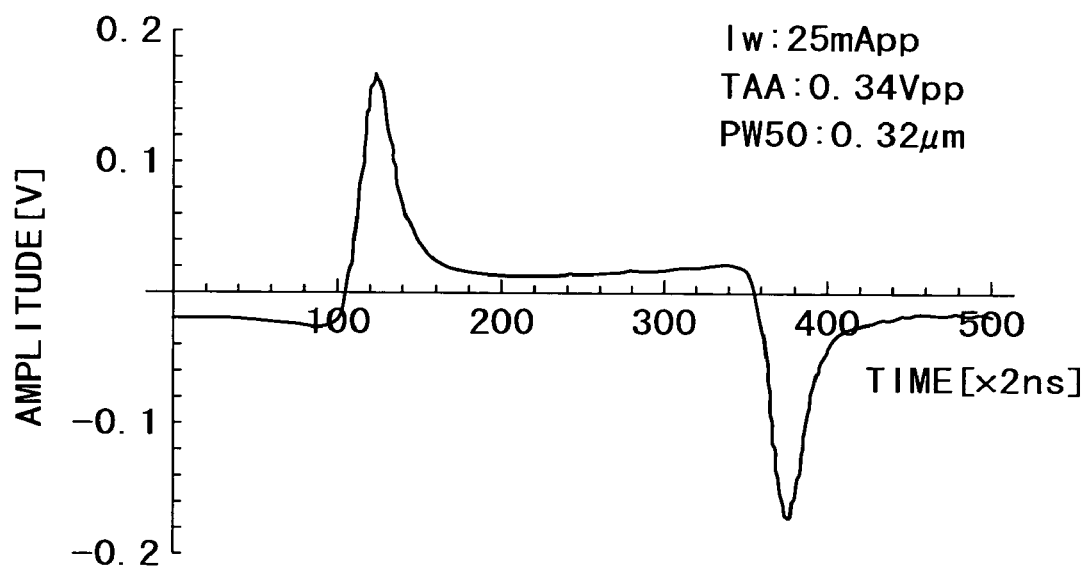
FIG. 21 is a diagram showing the waveform of a signal reproduced from an evaporation tape in the reversed direction.
Figure 22:
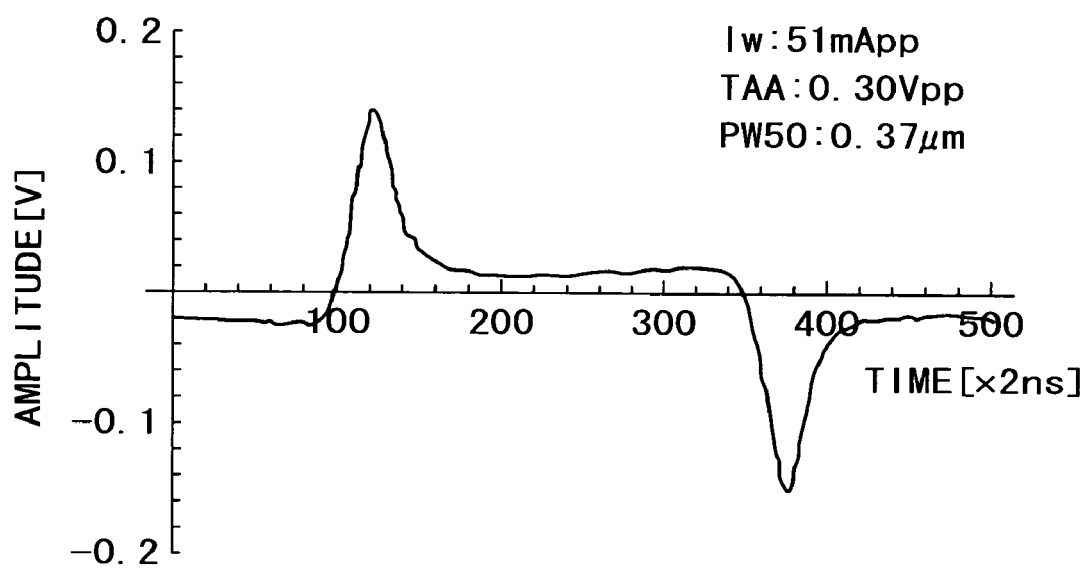
FIG. 22 is a diagram showing the waveform of a signal reproduced from an evaporation tape in the reversed direction.

FIGS. 20 to 22 are each a diagram showing a solitary reproduced waveform of a signal to be recorded on the magnetic tape 73 in the reversed direction. It is to be noted that the conditions shown in FIG. 6 were applied as the recording and reproducing conditions.

To be more specific, FIG. 20 is a diagram showing a solitary reproduced waveform of a signal recorded onto the magnetic tape 73 by flowing a recording current Iw of 10 mApp. For this waveform, the strength TAA of the recording and reproducing signal is 0.19 Vpp and the spatial resolution PW50 is 0.38 µm. FIG. 21 is a diagram showing a solitary reproduced waveform of a signal recorded onto the magnetic tape 73 by flowing a recording current Iw of 25 mApp. For this waveform, the strength TAA of the recording and reproducing signal is 0.34 Vpp and the spatial resolution PW50 is 0.32 µm. FIG. 22 is a diagram showing a solitary reproduced waveform of a signal recorded onto the magnetic tape 73 by flowing a recording current Iw of 51 mApp. For this waveform, the strength TAA of the recording and reproducing signal is 0.30 Vpp and the spatial resolution PW50 is 0.37 µm.

On the basis of the test results described above, the tape streamer 1 shown in FIG. 1 carries out the following recording or reproducing process.

Figure 23:
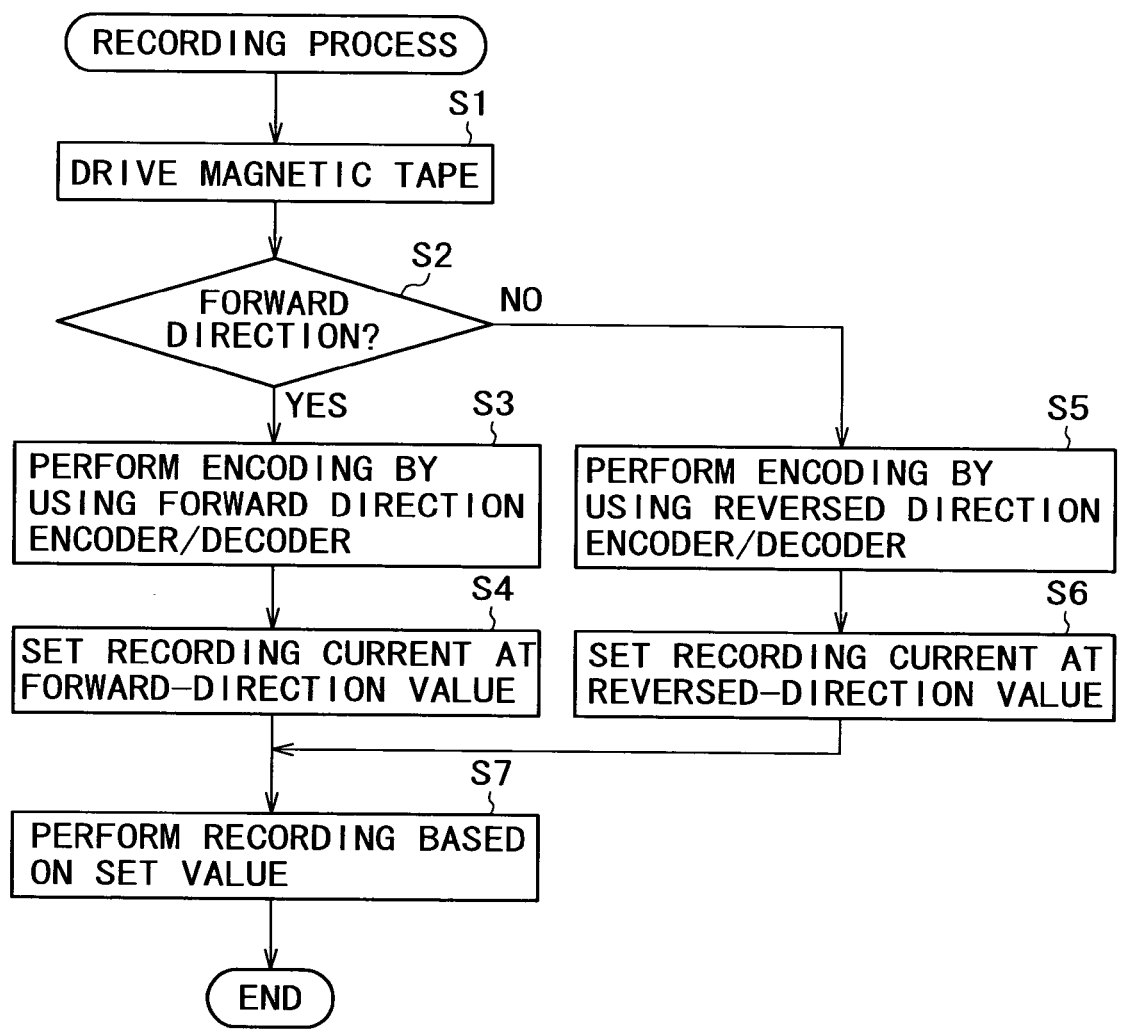
FIG. 23 shows a flowchart representing a process to record a signal on an evaporation tape with sufficiently small TA noises.

To be more specific, FIG. 23 shows a flowchart representing a process carried out by the tape streamer 1 to record a signal onto a magnetic tape, which is the evaporation tape tested as described above, for sufficiently small TA noises, that is, if an MIG head or an MR head causing sufficiently small TA noises is for example employed as a reproducing head not shown in the figure. This process is explained in detail by referring to the flowchart as follows.

At as a step S1, the recording and reproducing controller 13 drives the magnetic tape to travel at a predetermined speed. Then, at the next step S2, the recording and reproducing controller 13 forms a judgment as to whether the transfer direction of the magnetic tape is the forward or reversed direction.

If the outcome of the judgment formed at the step S2 indicates that the transfer direction of the magnetic tape is the forward direction, the recording and reproducing controller 13 continues the recording process to a step S3 at which a signal to be recorded is supplied to the forward-direction encoder/decoder 37a, which then encodes the signal. In this case, for example, the signal to be recorded is encoded for the PR4 equalization method. Then, at the next step S4, the recording and reproducing controller 13 sets the recording current at a forward direction value, which is greater than the value of the recording current for the reversed direction.

If the outcome of the judgment formed at the step S2 indicates that the transfer direction of the magnetic tape is not the forward direction, that is, the transfer direction of the magnetic tape is the reversed direction, on the other hand, the recording and reproducing controller 13 continues the recording process to a step S5 at which the signal to be recorded is supplied to the reversed-direction encoder/decoder 37b, which then encodes the signal. In this case, for example, the signal to be recorded is encoded for the PR1 equalization method. Then, at the next step S6, the recording and reproducing controller 13 sets the recording current at a reversed direction value, which is smaller than the value of the recording current for the forward direction.

After completing the processing carried out at the step S4 or S6, the recording and reproducing controller 13 continues the recording process to a step S7 at which the signal encoded for the determined equalization method is recorded onto the magnetic tape by flowing the set recording current. To put it concretely, the encoded signal to be recorded is supplied to the write buffer 43 synchronously with a clock signal generated by the frequency synthesizer 42 to be stored in the write buffer 43 temporarily. Then, the encoded signal to be recorded is read out from the write buffer 43 and amplified by the recording amplifier 11a. Finally, the amplified signal to be recorded is recorded onto the magnetic tape by means of the recording head not shown in the figure before the recording process is ended.

As described above, if the magnetic tape is traveling in the forward direction, the signal encoded for the PR4 equalization method is recorded onto the magnetic tape by flowing a recording current set at a value greater than the recording current for the reversed direction. If the magnetic tape is traveling in the reversed direction, on the other hand, the signal encoded for the PR1 equalization method is recorded onto the magnetic tape by flowing a recording current set at a value smaller than the recording current for the forward direction.

Thus, in accordance with the present invention, if the TA noises are sufficiently small, a difference in SDNR after waveform equalization between the traveling directions can be reduced because different equalization methods are adopted in dependence on the traveling direction of the magnetic tape. Since a signal is recorded onto the magnetic tape by flowing recording currents of different magnitudes in dependence on the traveling direction (that is, the transfer direction) of the magnetic tape, the strength TAA of the recording and reproducing signal and the spatial resolution PW50 can each be brought to an optimum value.

Figure 24:
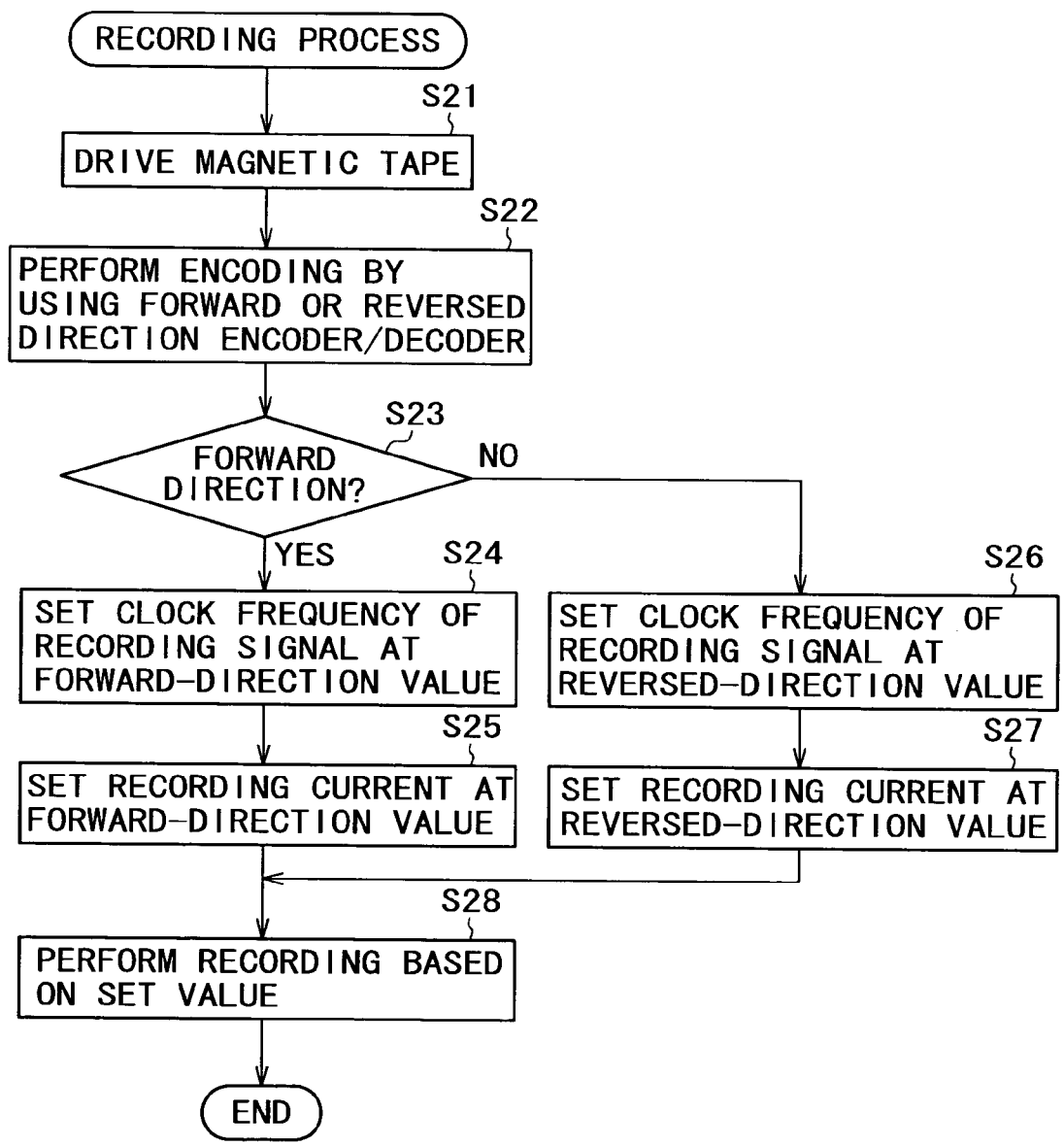
FIG. 24 shows a flowchart representing a process to record a signal on an evaporation tape with large TA noises.

Next, FIG. 24 shows a flowchart representing a process carried out by the tape streamer 1 to record a signal onto a magnetic tape for large TA noises, that is, if an MR head causing large TA noises is for example employed as a reproducing head. This process is explained in detail by referring to the flowchart as follows.

At as a step S21, the recording and reproducing controller 13 drives the magnetic tape to travel at a predetermined speed. Subsequently, at the next step S22, the recording and reproducing controller 13 supplies a signal to be recorded to the forward-direction encoder/decoder 37a (or the reversed-direction encoder/decoder 37b, which will also work as well) for encoding the signal for the PR4 equalization method.

Then, at the next step S23, the recording and reproducing controller 13 forms a judgment as to whether the transfer direction of the magnetic tape is the forward or reversed direction. If the outcome of the judgment indicates that the transfer direction of the magnetic tape is the forward direction, the recording and reproducing controller 13 continues the recording process to a step S24 at which a clock frequency controlled by the frequency synthesizer 42 is set at a forward direction value, which is higher than a frequency for the reversed direction. That is to say, the signal to be recorded is written onto the magnetic tape at a forward-direction line recording density, which is higher than a line recording density for the reversed direction. Then, at the next step S25, the recording and reproducing controller 13 sets the recording current at a forward direction value, which is greater than the value of the recording current for the reversed direction.

If the outcome of the judgment formed at the step S23 indicates that the transfer direction of the magnetic tape is not the forward direction, that is, the transfer direction of the magnetic tape is the reversed direction, on the other hand, the recording and reproducing controller 13 continues the recording process to a step S26 at which a clock frequency controlled by the frequency synthesizer 42 is set at a reversed direction value, which is lower than a frequency for the forward direction. That is to say, the signal to be recorded is written onto the magnetic tape at a reversed-direction line recording density, which is lower than a line recording density for the forward direction. Then, at the next step S27, the recording and reproducing controller 13 sets the recording current at a reversed direction value, which is smaller than the value of the recording current for the forward direction.

After completing the processing carried out at the step S25 or S27, the recording and reproducing controller 13 continues the recording process to a step S28 at which the signal to be recorded is written onto the magnetic tape by flowing the set recording current and on the basis of the set clock frequency. Finally, the recording process is ended.

That is to say, if the magnetic tape is traveling in the forward direction, the signal to be recorded is written onto the magnetic tape by flowing a recording current greater in magnitude than that for the reversed direction and at a line recording density higher than that for the reversed direction. If the magnetic tape is traveling in the reversed direction, on the other hand, the signal to be recorded is written onto the magnetic tape by flowing a recording current smaller in magnitude than that for the forward direction and at a line recording density lower than that for the forward direction.

As described above, in accordance with the present invention, if the TA noises are large, a difference in SDNR after waveform equalization between the traveling directions can be reduced because the signal to be recorded is written onto the magnetic tape at different line recording densities in dependence on the traveling direction, that is transfer direction, of the magnetic tape. Since the signal is recorded onto the magnetic tape by flowing recording currents of different magnitudes in dependence on the traveling direction of the magnetic tape, the strength TAA of the recording and reproducing signal and the spatial resolution PW50 can each be brought to an optimum value.

In the processes described above, as a method to change the line recording density of the signal to be recorded in accordance with the traveling direction of the magnetic tape, a method to vary the clock frequency of the signal is adopted. It is to be noted that, in place of the method to vary the clock frequency of the signal to be recorded, it is also possible to adopt a method to change the speed of the magnetic tape relative to the recording head.

In this case, if the magnetic tape is transferred in the forward direction, the recording and reproducing controller 13 increases the transfer speed of the magnetic tape to a value higher than that for the reversed direction. By adoption of this method, the data transfer speed in the recording and reproducing operations can be made constant without regard to whether the transfer direction of the magnetic tape is the forward or reversed direction.

By the way, compare FIG. 17 with 20, FIG. 18 with 21 and FIG. 19 with 22. The comparison indicates that the recording current Iw for the reversed direction is smaller than that for the forward direction. However, there are differences in solitary reproduced waveform between the traveling directions. To put it in detail, the solitary reproduced waveform for the forward direction has a gradual rising slope but an abrupt falling slope. On the other hand, the solitary reproduced waveform for the reversed direction has an abrupt rising slope but a gradual falling slope. Thus, the conditions for carrying out a reproducing process need to be changed in accordance with the traveling direction.

The following description explains a waveform equalizer for detecting digital data. A characteristic $Eq(f)$ of the waveform equalizer is expressed in terms of a transfer function G(f) of a magnetic recording channel and an equalization target T(f) by the following equation.

$$Eq(f) = T(f)/G(f) \quad (1)$$

It is to be noted that the transfer function G(f) is dependent on the traveling direction of the magnetic tape.

Figure 25:
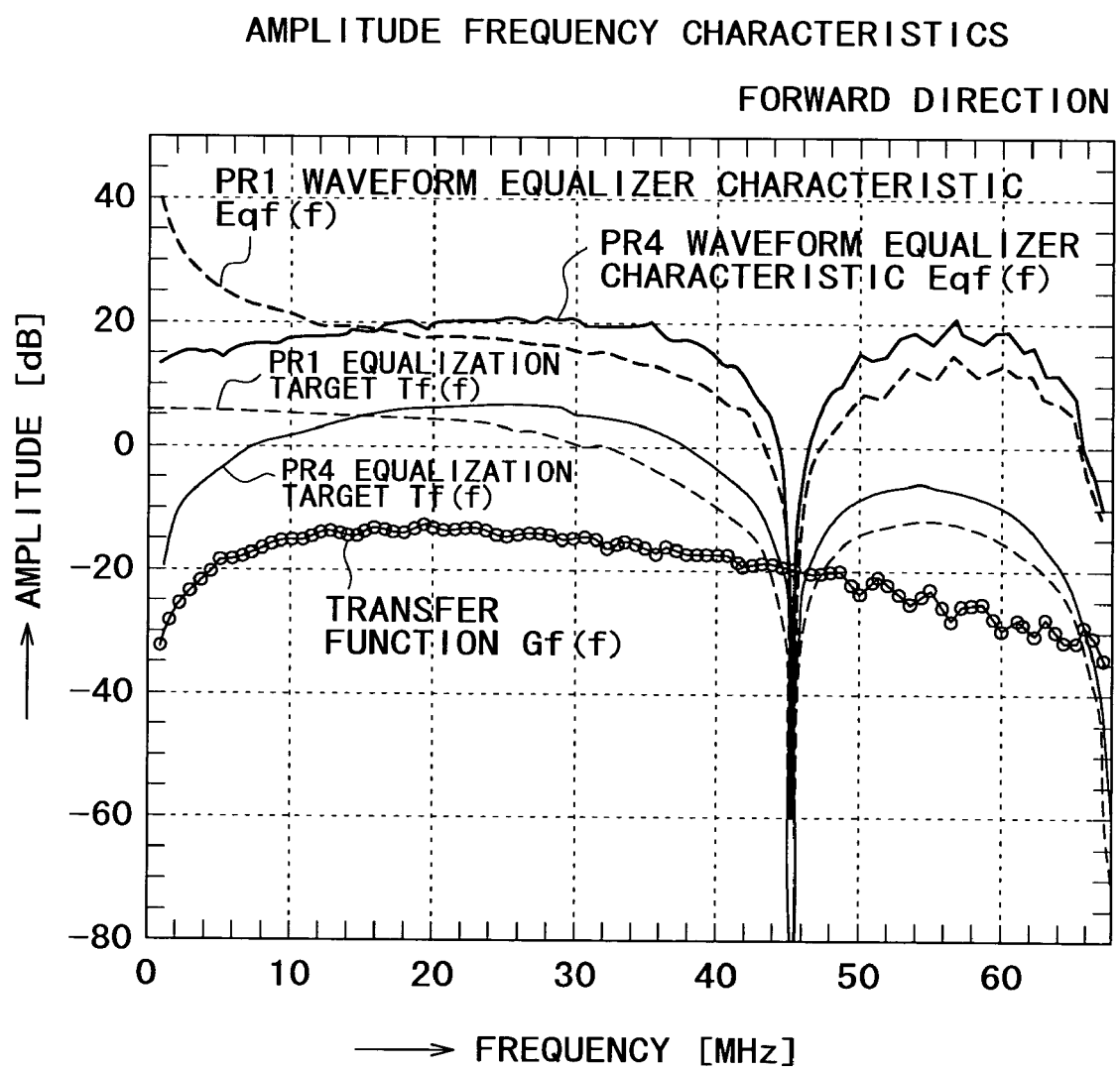
FIG. 25 is a diagram showing frequency characteristics of the amplitudes of a transfer function, an equalization target and a waveform equalizer characteristic for operations to reproduce a signal from an evaporation tape in the forward direction.
Figure 26:
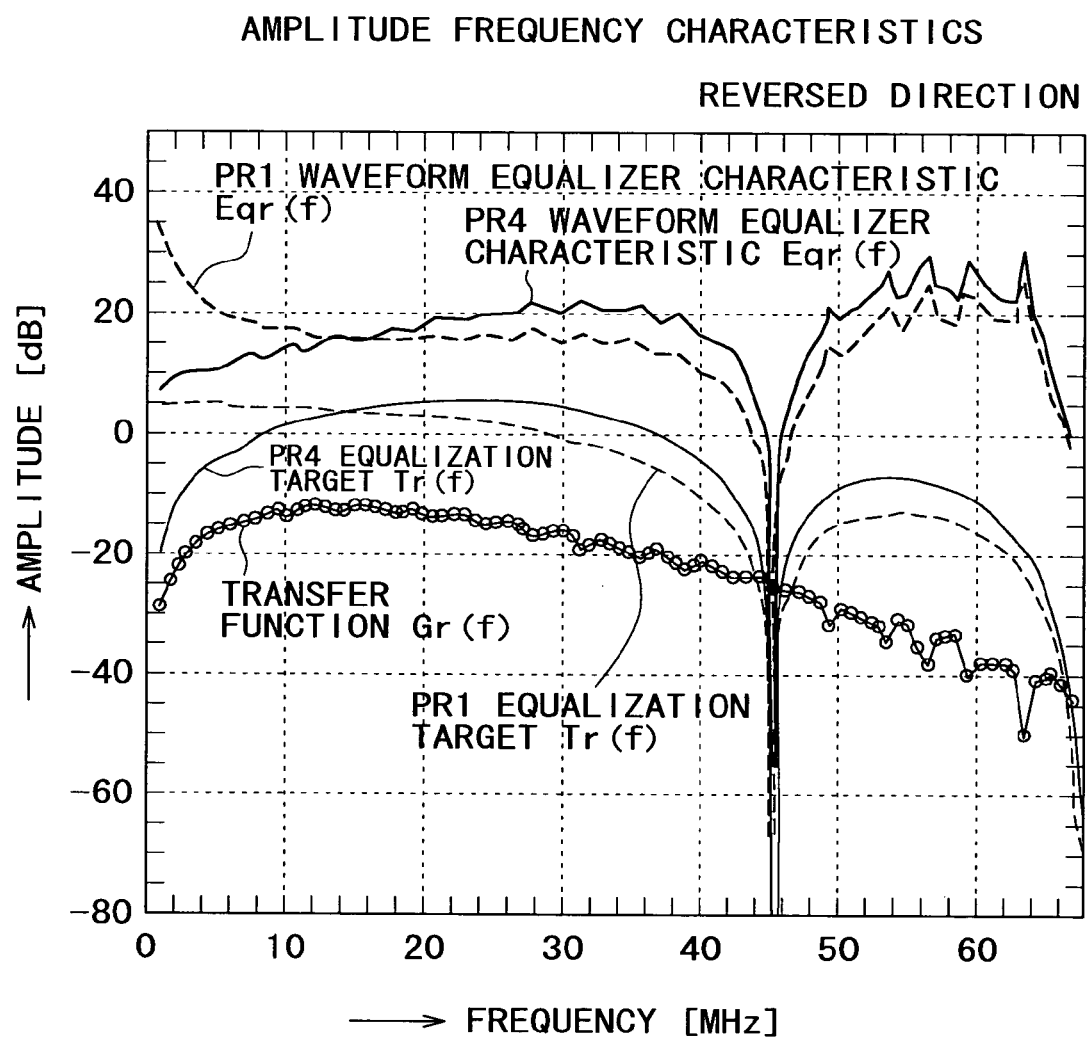
FIG. 26 is a diagram showing frequency characteristics of the amplitudes of a transfer function, an equalization target and a waveform equalizer characteristic for operations to reproduce a signal from an evaporation tape in the reversed direction.

FIGS. 25 and 26 are each a diagram showing frequency characteristics of the amplitudes of the transfer function G(f), the equalization target T(f) and the waveform equalizer characteristic Eq(f) at test times. To be more specific, FIG. 25 is a diagram showing frequency characteristics of the amplitudes of the transfer function Gf(f) for the forward direction, the equalization target Tf(f) adopting PR1 and PR4 as an equalization method and the waveform equalizer characteristic Eqf(f) for each equalization target Tf(f). FIG. 26 is a diagram showing frequency characteristics of the amplitudes of the transfer function Gr(f) for the reversed direction, the equalization target Tr(f) adopting PR1 and PR4 as an equalization method and the waveform equalizer characteristic Eqr(f) for each equalization target Tf(f).

Compare the amplitude of the transfer function Gf(f) for the forward direction with the amplitude of the transfer function Gr(f) for the reversed direction at the same equalization target T(f) for the forward and reversed directions, that is, for Tf(f)=Tr(f). The comparison indicates that, in the high-frequency region, the amplitude of the transfer function Gr(f) for the reversed direction is smaller than the amplitude of the transfer function Gf(f) for the forward direction. That is to say, in the high-frequency region, the amplitude of the waveform equalizer characteristic Eqr(f) for the reversed direction is greater than the amplitude of waveform equalizer characteristic Eqf(f) for the forward direction.

Figure 27:
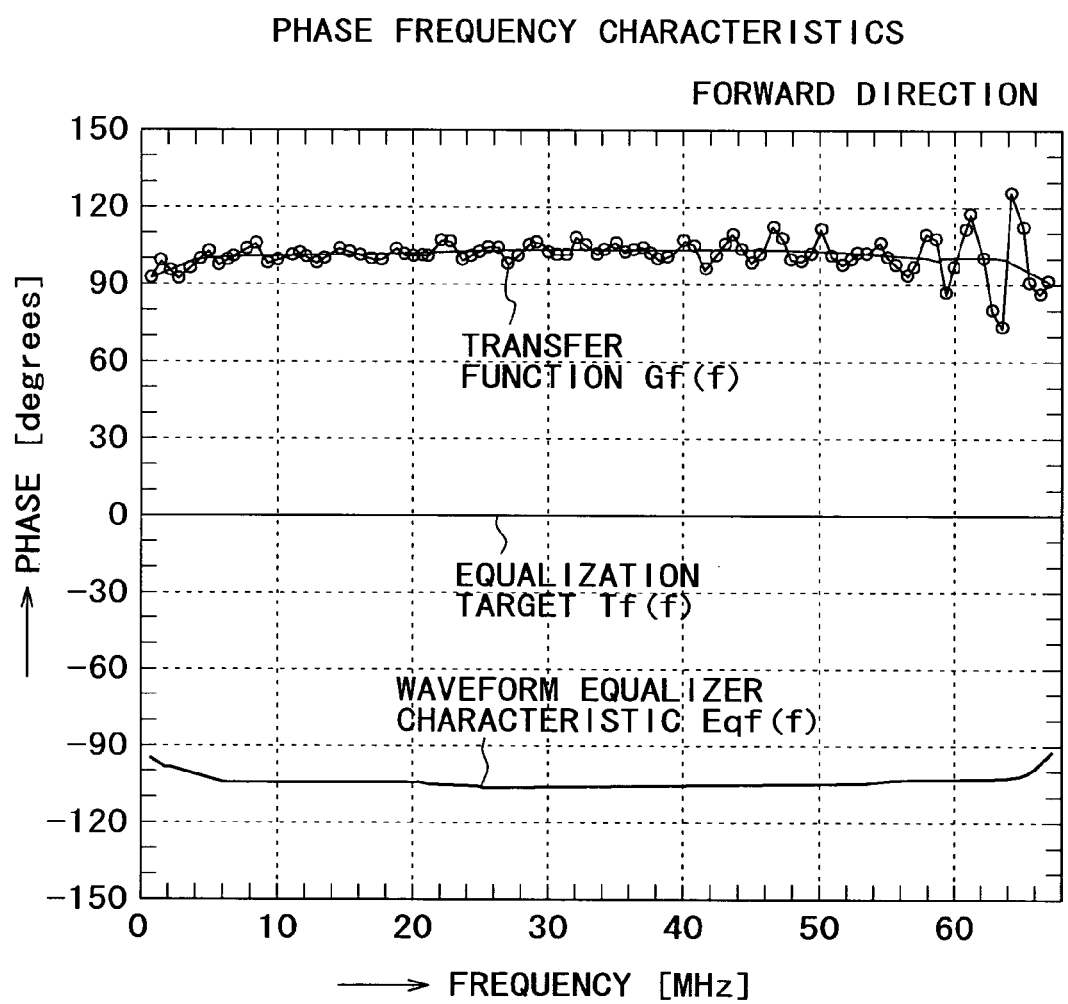
FIG. 27 is a diagram showing frequency characteristics of the phases of a transfer function, an equalization target and a waveform equalizer characteristic for operations to reproduce a signal from an evaporation tape in the forward direction.
Figure 28:
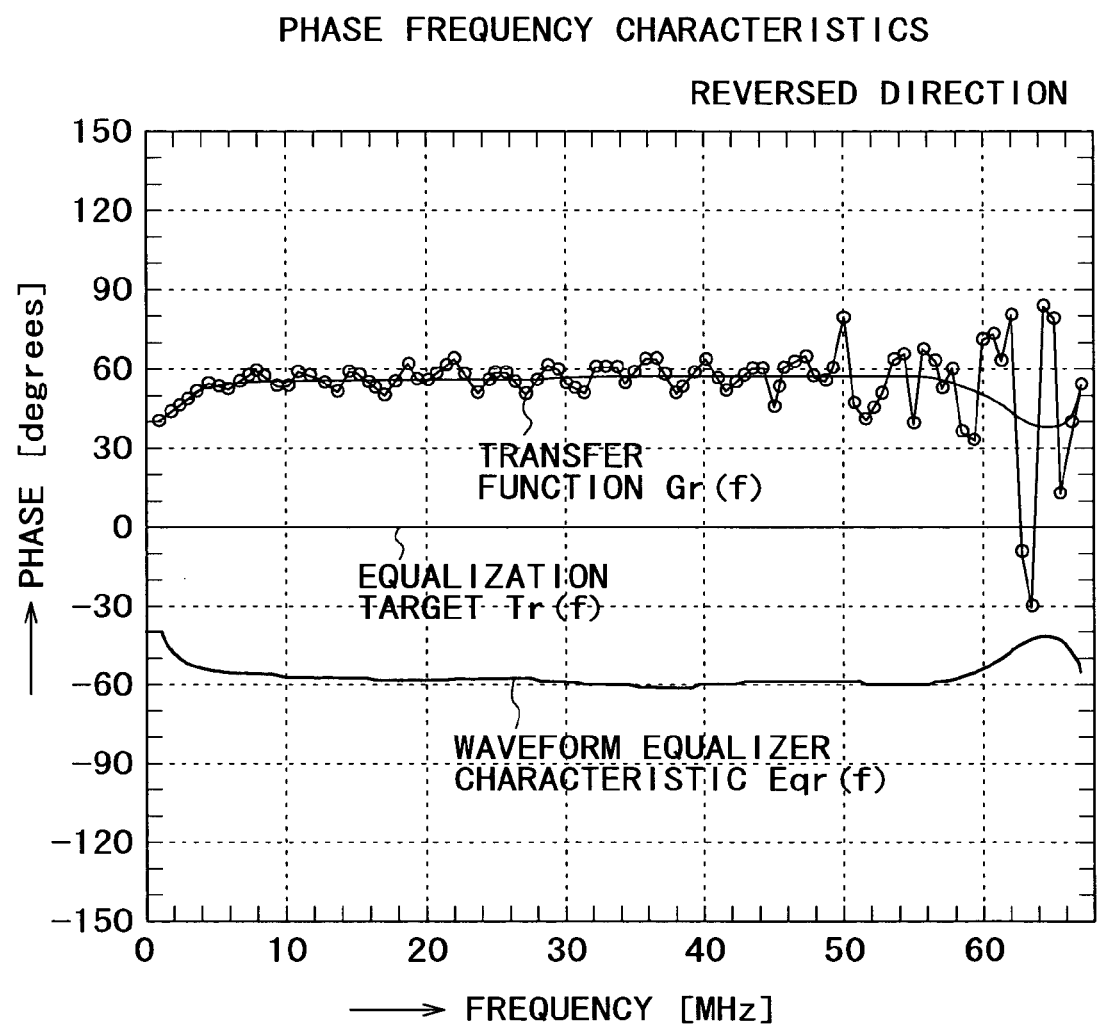
FIG. 28 is a diagram showing frequency characteristics of the phases of a transfer function, an equalization target and a waveform equalizer characteristic for operations to reproduce a signal from an evaporation tape in the reversed direction.

FIGS. 27 and 28 are each a diagram showing phase characteristics of the amplitudes of the transfer function G(f), the equalization target T(f) and the waveform equalizer characteristic Eq(f) at test times. To be more specific, FIG. 27 is a diagram showing phase characteristics of the amplitudes of the transfer function Gf(f) for the forward direction, the equalization target Tf(f) adopting PR1 and PR4 as an equalization method and the waveform equalizer characteristic Eqf(f) for each equalization target Tf(f). FIG. 28 is a diagram showing phase characteristics of the amplitudes of the transfer function Gr(f) for the reversed direction, the equalization target Tr(f) adopting PR1 and PR4 as an equalization method and the waveform equalizer characteristic Eqr(f) for each equalization target Tf(f).

Compare the phase of the transfer function Gf(f) for the forward direction with the phase of the transfer function Gr(f) for the reversed direction at the same equalization target T(f) for the forward and reversed directions, that is, for Tf(f)=Tr(f). The comparison indicates that the phase of the transfer function Gf(f) for the forward direction is about +105 degrees while the phase of the transfer function Gr(f) for the reversed direction is about +60 degrees. That is to say, the phase of the waveform equalizer characteristic Eqf(f) for the forward direction is about −105 degrees while the phase of waveform equalizer characteristic Eqr(f) for the reversed direction is about −60 degrees.

In this way, if the waveform equalizer characteristic Eqf(f) for the forward direction is applied as it is for the reversed direction, the equalization error in the reversed direction increases so that the reliability of the recording and reproducing operations can not be sustained any more. Thus, as shown in FIG. 1, the forward-direction analog equalizer 32a and the reversed-direction analog equalizer 32b of the tape streamer 1 are provided with respectively frequency-characteristic correction circuit 51a and 51b for the equalization of the frequency characteristics as well as respectively phase-characteristic correction circuit 52a and 52b for the equalization of the phase characteristics. Such frequency and phase characteristics are set so that a proper waveform equalizer characteristic Eqf(f) for the forward direction and a proper waveform equalizer characteristic Eqr(f) are brought about for respectively the transfer function Gf(f) for the forward direction and the transfer function Gr(f) for the reversed direction with respect to the frequency and the phase.

That is to say, in this case, the phase-characteristic correction circuit 52a has a phase characteristic of about −105 degrees and the phase-characteristic correction circuit 52b has a phase characteristic of about −60 degrees in the entire band shown in FIGS. 27 and 28.

Figure 29:
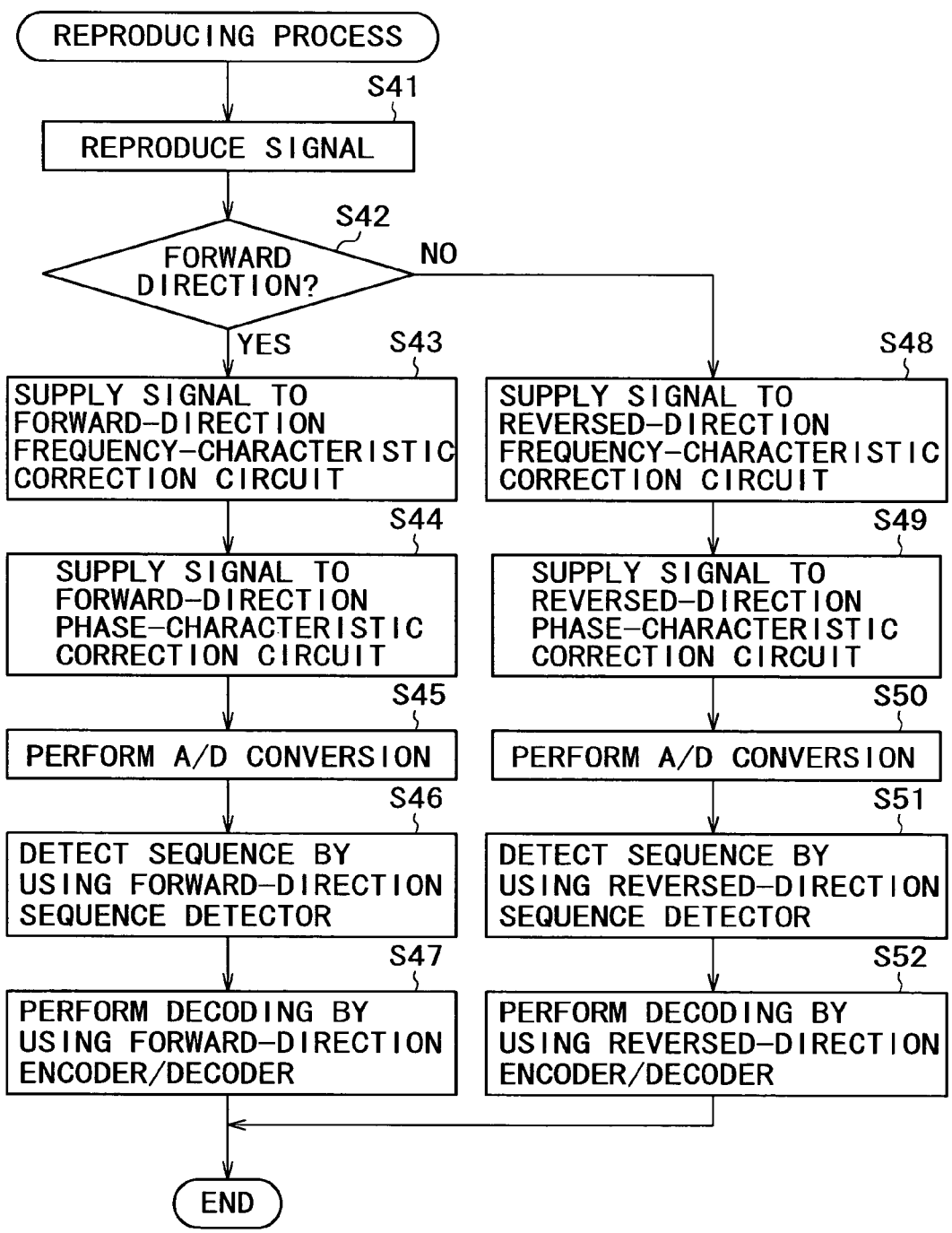
FIG. 29 shows a flowchart representing a process to reproduce a signal on an evaporation tape with sufficiently small TA noises.

FIG. 29 shows a flowchart representing a process carried out by the tape streamer 1 to reproduce a signal from the magnetic tape with sufficiently small TA noises, that is, if an MIG head or an MR head causing sufficiently small TA noises is for example employed as a reproducing head not shown in the figure. This process is explained by referring to the flowchart as follows.

At a step S41, the recording and reproducing controller 13 drives the reproducing head to reproduce a signal from the magnetic tape. Then, at the next step S42, the recording and reproducing controller 13 forms a judgment as to whether the transfer direction of the magnetic tape is the forward or reversed direction. If the outcome of the judgment indicates that the transfer direction of the magnetic tape is the forward direction, the recording and reproducing controller 13 continues the reproducing process to a step S43 at which the reproduced signal is amplified by using the reproducing amplifier 11b and the VGA 31. The recording and reproducing controller 13 then executes control to supply the amplified reproduced signal to the frequency-characteristic correction circuit 51a employed in the forward-direction analog equalizer 32a. In the frequency-characteristic correction circuit 51a, the frequency characteristic of the amplified reproduced signal is subjected to equalization processing adopting typically the PR4 equalization method. Then, at the next step S44, the recording and reproducing controller 13 executes control to supply the reproduced signal to the phase-characteristic correction circuit 52a also employed in the forward-direction analog equalizer 32a. In the phase-characteristic correction circuit 52a, the phase characteristic of the reproduced signal is subjected to equalization processing. Typically, the reproduced signal is subjected to equalization processing at a phase characteristic of about −115 degrees in the entire band shown in FIG. 27.

Subsequently, at the next step S45, the reproduced signal completing the equalization processing carried out in the forward-direction analog equalizer 32a is supplied to the ADC 34 for carrying out A/D conversion processing to covert the signal into a digital signal. Then, at the next step S46, the recording and reproducing controller 13 executes control to supply the digital reproduced waveform to the forward direction sequence detector 36a, which detects a recording sequence from the waveform, by way of the adaptive FIR filter 35. Subsequently, at the next step S47, the output of the forward-direction sequence detector 36a is supplied to the forward-direction encoder/decoder 37a, which decodes the output into data for an equalization method of the forward direction. In this case, for example, the forward-direction encoder/decoder 37a decodes the output into data for the PR4 equalization method.

If the outcome of the judgment formed at the step S42 indicates that the transfer direction of the magnetic tape is not the forward direction, that is, the transfer direction of the magnetic tape is the reversed direction, on the other hand, the recording and reproducing controller 13 continues the reproducing process to a step S48 at which the reproduced signal is supplied to the frequency-characteristic correction circuit 51b employed in the reversed-direction analog equalizer 32b. In the frequency-characteristic correction circuit 51b, the frequency characteristic of the amplified reproduced signal is subjected to equalization processing adopting typically the PR1 equalization method. Then, at the next step S49, the recording and reproducing controller 13 executes control to supply the reproduced signal to the phase-characteristic correction circuit 52b also employed in the reversed-direction analog equalizer 32b. In the phase-characteristic correction circuit 52b, the phase characteristic of the reproduced signal is subjected to equalization processing. Typically, the reproduced signal is subjected to equalization processing at a phase characteristic of about −60 degrees in the entire band shown in FIG. 28.

Subsequently, at the next step S50, the reproduced signal completing the equalization processing carried out in the reversed-direction analog equalizer 32b is supplied to the ADC 34 for carrying out A/D conversion processing to covert the signal into a digital signal. Then, at the next step S51, the recording and reproducing controller 13 executes control to supply the digital reproduced waveform to the forward direction sequence detector 36b, which detects a recording sequence from the waveform, by way of the adaptive FIR filter 35. Subsequently, at the next step S52, the output of the reversed-direction sequence detector 36b is supplied to the reversed-direction encoder/decoder 37b, which decodes the output into data for an equalization method of the reversed direction. In this case, for example, the reversed-direction encoder/decoder 37b decodes the output into data for the PR1 equalization method.

Figure 30:
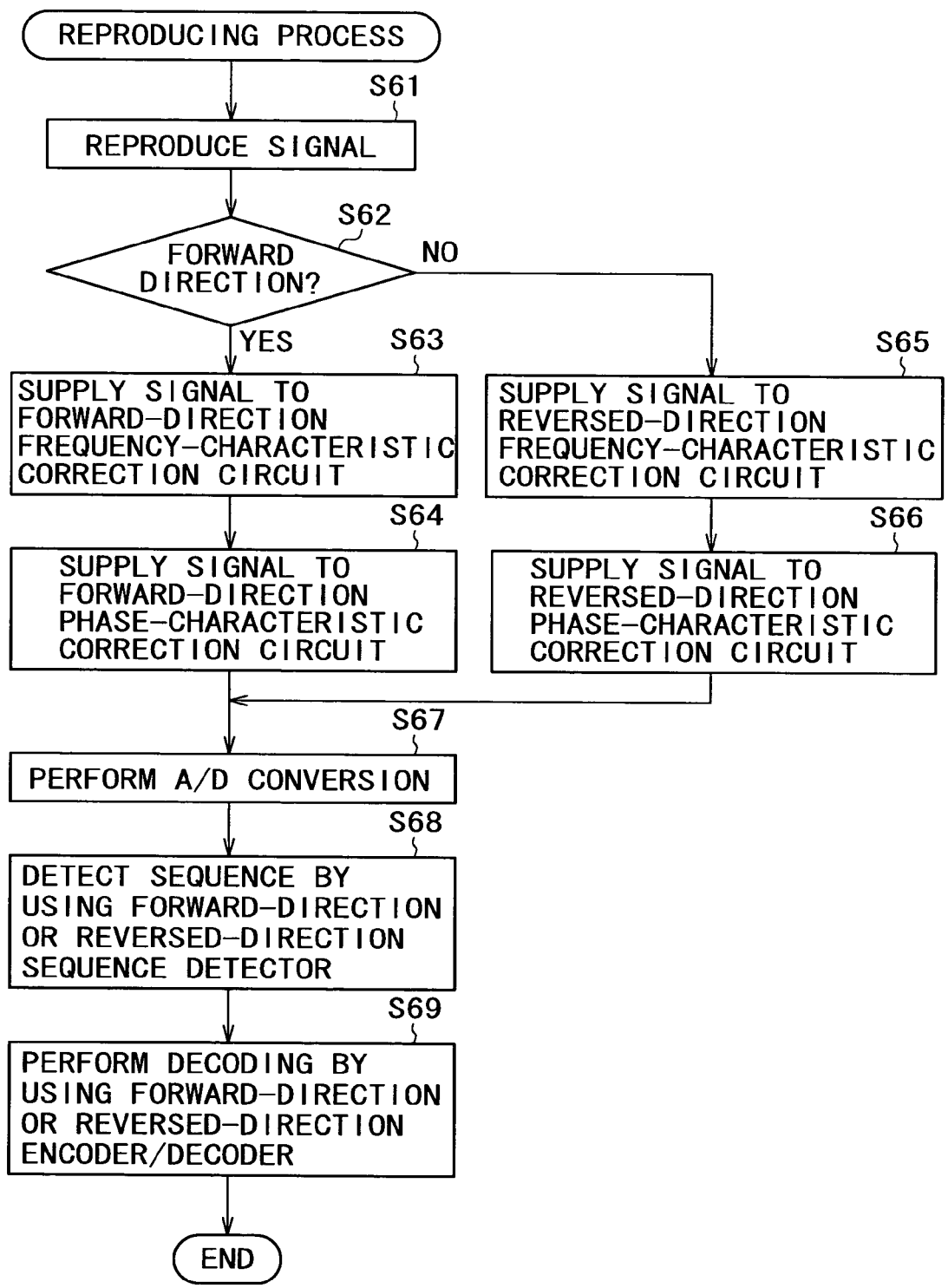
FIG. 30 shows a flowchart representing a process to reproduce a signal on an evaporation tape with large TA noises.

Next, FIG. 30 shows a flowchart representing a process carried out by the tape streamer 1 to reproduce a signal from a magnetic tape with large TA noises, that is, if an MR head causing large TA noises is for example employed as a reproducing head. This process is explained by referring to the flowchart as follows.

At a step S61, the recording and reproducing controller 13 drives the reproducing head to reproduce a signal from the magnetic tape. At that time, the traveling speed of the tape is set at a value corresponding to the operation to record the signal onto the magnetic tape. Then, at the next step S62, the recording and reproducing controller 13 forms a judgment as to whether the transfer direction of the magnetic tape is the forward or reversed direction. If the outcome of the judgment indicates that the transfer direction of the magnetic tape is the forward direction, the recording and reproducing controller 13 continues the reproducing process to a step S63 at which the reproduced signal is amplified by using the reproducing amplifier 11b and the VGA 31. The recording and reproducing controller 13 then executes control to supply the amplified reproduced signal to the frequency-characteristic correction circuit 51a employed in the forward-direction analog equalizer 32a. In the frequency-characteristic correction circuit 51a, the frequency characteristic of the amplified reproduced signal is subjected to equalization processing. Then, at the next step S64, the recording and reproducing controller 13 supplies the reproduced signal to the phase-characteristic correction circuit 52a also employed in the forward-direction analog equalizer 32a. In the phase-characteristic correction circuit 52a, the phase characteristic of the reproduced signal is subjected to equalization processing. Typically, the reproduced signal is subjected to equalization processing at a phase characteristic of about −115 degrees in the entire band shown in FIG. 27.

If the outcome of the judgment formed at the step S62 indicates that the transfer direction of the magnetic tape is not the forward direction, that is, the transfer direction of the magnetic tape is the reversed direction, on the other hand, the recording and reproducing controller 13 continues the reproducing process to a step S65 at which the reproduced signal is supplied to the frequency-characteristic correction circuit 51b employed the reversed-direction analog equalizer 32b. In the frequency-characteristic correction circuit 51b, the frequency characteristic of the amplified reproduced signal is subjected to equalization processing. Then, at the next step S66, the recording and reproducing controller 13 supplies the reproduced signal to the phase-characteristic correction circuit 52b also employed the reversed-direction analog equalizer 32b. In the phase-characteristic correction circuit 52b, the phase characteristic of the reproduced signal is subjected to equalization processing. Typically, the reproduced signal is subjected to equalization processing at a phase characteristic of about −60 degrees in the entire band shown in FIG. 28.

After the processing carried out at the step S64 or S66 is completed, the flow of the reproducing process goes on to a step S67 at which the reproduced signal completing the equalization processing carried out in the forward-direction analog equalizer 32a or the reversed-direction analog equalizer 32b is supplied to the ADC 34 for carrying out A/D conversion processing to covert the signal into a digital signal.

The output of the ADC 34 is supplied to the phase error unit 38 for detecting a phase error. The VCO 39 is driven by a control voltage corresponding to the detected phase error. A clock signal generated by the VCO 39 is supplied to the ADC 34 to be used for sampling. If the phase-characteristic correction circuit 52a or the phase-characteristic correction circuit 52b does not correct the phase characteristic, it will be difficult for the PLL comprising the ADC 34, the VCO 39 and the phase error unit 38 to extract clock components. Since the phase characteristic is corrected in the present invention, however, the clock components can be extracted with a high degree of reliability.

Then, at the next step S68, the recording and reproducing controller 13 supplies the reproduced waveform completing the A/D conversion processing to the forward-direction sequence detector 36a or the reversed-direction sequence detector 36b, which detects a recording sequence from the waveform, by way of the adaptive FIR filter 35. Subsequently, at the next step S69, the output of the forward-direction sequence detector 36a or the reversed-direction sequence detector 36b is supplied respectively to the forward-direction encoder/decoder 37a or the reversed-direction encoder/decoder 37b, which decodes the output into data for an equalization method of the forward or reversed direction. In this case, for example, the forward-direction encoder/decoder 37a or the reversed-direction encoder/decoder 37b decodes the output into data for the PR4 equalization method.

It is to be noted that, in accordance with the above description, even in the case of large TA noises, that is, even if an MR head causing large TA noises is for example employed as a reproducing head, the forward-direction sequence detector 36a and the reversed-direction sequence detector 36b are provided. For large TA noises, however, it is not necessary to change the equalization method. That is to say, the forward-direction sequence detector 36*a* or the reversed-direction sequence detector 36*b* can be used as a common sequence detector whereas the forward-direction encoder/decoder 37*a* or the reversed-direction encoder/decoder 37*b* can be used as a common encoder/decoder.

In accordance with the above description, the PR1 and PR4 equalization methods are adopted. However, the PR1 equalization method may be replaced by an equalization method including a direct-current component, an equalization method using a long-wave component or an equalization method of the integral type. An example of the equalization method including a direct-current component is a PR2 equalization method. By the same token, the PR4 equalization method may be replaced by an equalization method including no direct-current component, an equalization method using a short-wave component or an equalization method of the differential type. Examples of the equalization method including no direct-current component are EPR4 and E2PR4 equalization methods.

Embodiments each applying the present invention to a tape streamer have been described above. Nevertheless, the scope of the present invention is not limited to these embodiments. For example, the present invention can be applied to any apparatus for recording and reproducing data onto and from a tape-shaped magnetic recording medium.

Each series of operations described above can be carried out by hardware or software. If a series of operations described above is carried out by software, a program composing the software is installed into a tape streamer embedded in special-purpose hardware or a general-purpose tape streamer from a network or a recording medium. A general-purpose tape streamer is a tape streamer capable of carrying out a variety of functions by execution of a variety of programs installed in the tape streamer.

The recording medium can be a piece of package media such as the removable memory 62. The recording medium containing a program recorded in advance is presented to the user separately from the main unit of the tape streamer 1 as shown in FIG. 1 for the purpose of distributing a program to the user. As an alternative, the recording medium can be an internal memory employed in the recording and reproducing controller 13. Thus, such a recording medium is presented to the user in a state of being embedded in advance in the main unit of the recording and reproducing controller 13.

It is to be noted that, in this specification, steps prescribing a program recorded on a recording medium are of course operations carried out sequentially in accordance with a predetermined sequence of the steps along the time axis. However, the steps are not necessarily executed sequentially. Instead, the steps may include operations to be carried out concurrently or individually.

The embodiments described above are no more than preferred embodiments of the present invention. That is to say, the scope of the present invention is not limited to the preferred embodiments. A person skilled in the art will be capable to come up with a variety of applications and modifications of the embodiments within the domain of technological concepts described in claims appended to this specification. Nevertheless, configurations of such applications and such modifications are also interpreted as parts included in the range of the present invention.

What is claimed is:

1. A recording apparatus for a tape-shaped recording medium having an anisotropic property oblique in a direction relative to a thickness direction thereof, said recording apparatus comprising:

transfer means capable for transferring said tape-shaped recording medium in a forward direction in both a recording mode and a reproducing mode and capable for transferring said tape-shaped recording medium in a reverse direction in both said recording mode and said reproducing mode;

a recording head arranged to create a recording track in a direction parallel to said forward or reverse transfer directions of said tape-shaped recording medium;

a signal-processing unit connected to said recording head and supplied with a signal to be recorded for carrying out signal processing required for a recording operation on the signal to be recorded; and a control unit for controlling operations of said signal-processing unit, for forming a judgment as to whether a transfer direction of said tape-shaped recording medium transferred by said transfer means is said forward direction or said reverse direction, and for controlling said signal-processing unit in accordance with a result of said judgment, wherein when an outcome of said judgment indicates said transfer direction of said tape-shaped recording medium is said forward direction, said control unit controls said signal-processing unit so that a recording current supplied to said recording head is set at a value greater than a value of a recording current supplied to said recording head while said magnetic tape is traveling in said reverse direction.

2. The recording apparatus for a tape-shaped recording medium in accordance with claim 1, wherein:

when a magnetic head causing a small thermal asperity noise is employed as said recording head, said control unit controls said signal-processing unit so that said signal to be recorded is subjected to an encoding process adopting a method known as partial response class 4.

3. The recording apparatus for a tape-shaped recording medium in accordance with claim 1, wherein:

when a magnetic head causing a large thermal asperity noise is employed as said recording head, said control unit controls said signal-processing unit so that a line recording density is increased to a value greater than a value of a line recording density for said reverse direction.

4. The recording apparatus for a tape-shaped recording medium in accordance with claim 3, wherein said control unit increases a frequency of a clock signal supplied to said signal-processing unit.

5. A recording apparatus for a tape-shaped recording medium having an anisotropic property oblique in a direction relative to a thickness direction thereof, said recording apparatus comprising:

transfer means capable for transferring said tape-shaped recording medium in a forward direction in both a recording mode and a reproducing mode and capable for transferring said tape-shaped recording medium in a reverse direction in both said recording mode and said reproducing mode;

a recording head arranged to create a recording track in a direction parallel to said forward or reverse transfer directions of said tape-shaped recording medium;

a signal-processing unit connected to said recording head and supplied with a signal to be recorded for carrying out signal processing required for a recording operation on the signal to be recorded; and a control unit for controlling operations of said signal-processing unit, for forming a judgment as to whether a transfer direction of said tape-shaped recording medium transferred by said transfer means is said forward direction or said reverse direction, and for controlling said signal-processing unit in accordance with a result of said judgment, wherein when an outcome of said judgment indicates that said transfer direction of said tape-shaped recording medium is said reverse direction, said control unit controls said signal-processing unit so that a recording current supplied to said recording head is set at a value smaller than a value of a recording current supplied to said recording head while said magnetic tape is traveling in said forward direction.

6. The recording apparatus for a tape-shaped recording medium in accordance with claim 5, wherein:

when a magnetic head causing a small thermal asperity noise is employed as said recording head, said control unit controls said signal-processing unit so that said signal to be recorded is subjected to an encoding process adopting a method known as partial response class 1.

7. The recording apparatus for a tape-shaped recording medium in accordance with claim 5, wherein:

when a magnetic head causing a large thermal asperity noise is employed as said recording head, said control unit controls said signal-processing unit so that a line recording density is decreased to a value smaller than a value of a line recording density for said forward direction.

8. The recording apparatus for a tape-shaped recording medium in accordance with claim 7, wherein said control unit decreases a frequency of a clock signal supplied to said signal-processing unit.

9. A reproducing apparatus for a tape-shaped recording medium having an anisotropic property oblique in a direction relative to a thickness direction thereof, said reproducing apparatus comprising:

transfer means capable for transferring said tape-shaped recording medium in a forward direction in both a recording mode and a reproducing mode and capable for transferring said tape-shaped recording medium in a reverse direction in both said recording mode and said reproducing mode;

a reproducing head for scanning said tape-shaped recording medium along a recording track created in a direction parallel to said transfer directions of said tape-shaped recording medium;

a signal-processing unit supplied with an output signal from said reproducing head for carrying out signal processing required for a reproducing operation on an output signal from said reproducing head; and a control unit for controlling operations of said signal-processing unit, for forming a judgment as to whether said transfer direction of said tape-shaped recording medium transferred by said transfer means is said forward direction or said reverse direction, and for controlling said signal-processing unit in accordance with a result of said judgment, wherein said control unit switches signal processing carried out on a phase characteristic in said signal processing unit from a first kind of processing to a second kind of processing in dependence on an outcome of said judgment.

10. The reproducing apparatus for a tape-shaped recording medium in accordance with claim 9, wherein:

when an outcome of said judgment indicates that said transfer direction of said tape-shaped recording medium is said forward direction, said signal-processing unit carries out signal processing on said phase characteristic of said reproduced signal output by said reproducing head at a first angle over the entire frequency band of said reproduced signal.

11. The reproducing apparatus for a tape-shaped recording medium in accordance with claim 10, wherein:

when a magnetic head causing a small thermal asperity noise is employed as said reproducing head, said control unit controls said signal-processing unit so that said reproduced signal output by said reproducing head is subjected to signal processing carried out on a frequency characteristic by adoption of a method known as partial response class 4.

12. The reproducing apparatus for a tape-shaped recording medium in accordance with claim 11, wherein, after said signal processing is carried out on said phase characteristic of said reproduced signal output by said reproducing head, said signal-processing unit carries out decoding processing by adoption of a method known as partial response class 4 on said reproduced signal.

13. The reproducing apparatus for a tape-shaped recording medium in accordance with claim 10, wherein:

a magnetic head causing a large thermal asperity noise is employed as said reproducing head; and said control unit controls said signal-processing unit so that said reproduced signal output by said reproducing head is subjected to signal processing carried out on a frequency characteristic thereof.

14. The reproducing apparatus for a tape-shaped recording medium in accordance with claim 13, wherein, after said signal processing is carried out on said phase characteristic of said reproduced signal output by said reproducing head, said signal-processing unit carries out decoding processing by adoption of a method known as partial response class 4 on said reproduced signal.

15. The reproducing apparatus for a tape-shaped recording medium in accordance with claim 9, wherein:

when an outcome of said judgment indicates that said transfer direction of said tape-shaped recording medium is said reverse direction, said signal-processing unit carries out signal processing on said phase characteristic of said reproduced signal output by said reproducing head at a predetermined angle over an entire frequency band of said reproduced signal.

16. The reproducing apparatus for a tape-shaped recording medium in accordance with claim 15, wherein:

when a magnetic head causing a small thermal asperity noise is employed as said reproducing head, said control unit controls said signal-processing unit so that said reproduced signal output by said reproducing head is subjected to signal processing carried out on a frequency characteristic by adoption of a method known as partial response class 1.

17. The reproducing apparatus for a tape-shaped recording medium in accordance with claim 16, wherein, after said signal processing is carried out on said phase characteristic of said reproduced signal output by said reproducing head, said signal-processing unit carries out decoding processing by adoption of a method known as partial response class 1 on said reproduced signal.

18. The reproducing apparatus for a tape-shaped recording medium in accordance with claim 15, wherein:

a magnetic head causing a large thermal asperity noise is employed as said reproducing head; and said control unit controls said signal-processing unit so that said reproduced signal output by said reproducing head is subjected to signal processing carried out on a frequency characteristic thereof.

19. The reproducing apparatus for a tape-shaped recording medium in accordance with claim 18, wherein, after said signal processing is carried out on said phase characteristic of said reproduced signal output by said reproducing head, said signal-processing unit carries out decoding processing by adoption of a method known as partial response class 4 on said reproduced signal.

20. A recording and reproducing apparatus for a tape-shaped recording medium having an anisotropic property oblique in a direction relative to a thickness direction thereof, said recording and reproducing apparatus comprising:

transfer means capable for transferring said tape-shaped recording medium in a forward direction in both a recording mode and a reproducing mode and capable for transferring said tape-shaped recording medium in a reverse direction in both said recording mode and said reproducing mode;

a recording and/or reproducing head arranged to create a recording track in a direction parallel to said forward and reverse transfer directions of said tape-shaped recording medium for scanning said tape-shaped recording medium along said recording track;

a signal-processing unit connected to said recording and/or reproducing head and supplied with a signal to be recorded and with an output signal from said reproducing head, said signal-processing unit carrying out signal processing required for the recording operation on a signal to be recorded and carrying out signal processing required for a reproducing operation on the output signal from said reproducing head; and a control unit for controlling operations of said signal-processing unit, for forming a judgment as to whether said transfer direction of said tape-shaped recording medium transferred by said transfer means is said forward direction or said reverse direction, and for controlling said signal-processing unit in accordance with a result of said judgment, wherein when a magnetic head causing a small thermal asperity noise is employed as said recording head and an outcome of said judgment indicates that said transfer direction of said tape-shaped recording medium is said forward direction, said control unit controls said signal-processing unit so that said signal to be recorded is subjected to an encoding process adopting a method known as partial response class 4.

21. The recording and reproducing apparatus for a tape-shaped recording medium in accordance with claim 20, wherein said control unit controls said signal-processing unit so that a recording current supplied to said recording head is set at a value greater than a value of a recording current supplied to said recording head when said magnetic tape is traveling in said reverse direction.

22. The recording and reproducing apparatus for a tape-shaped recording medium in accordance with claim 20, wherein:

when an outcome of said judgment indicates that said transfer direction of said tape-shaped recording medium is said direction, said control unit controls said signal-processing unit so that said signal to be recorded is subjected to an encoding process adopting a method known as partial response class 1.

23. The recording and reproducing apparatus for a tape-shaped recording medium in accordance with claim 22, wherein said control unit controls said signal-processing unit so that a recording current supplied to said recording head is set at a value smaller than a value of a recording current supplied to said recording head when said magnetic tape is traveling in said forward direction.

24. A recording and reproducing apparatus for a tape-shaped recording medium having an anisotropic property oblique in a direction relative to a thickness direction thereof, said recording and reproducing apparatus comprising:

transfer means capable for transferring said tape-shaped recording medium in a forward direction in both a recording mode and a reproducing mode and capable for transferring said tape-shaped recording medium in a reverse direction in both said recording mode and said reproducing mode;

a recording and/or reproducing head arranged to create a recording track in a direction parallel to said forward and reverse transfer directions of said tape-shaped recording medium for scanning said tape-shaped recording medium along said recording track;

a signal-processing unit connected to said recording and/or reproducing head and supplied with a signal to be recorded and with an output signal from said reproducing head, said signal-processing unit carrying out signal processing required for the recording operation on a signal to be recorded and carrying out signal processing required for a reproducing operation on the output signal from said reproducing head; and a control unit for controlling operations of said signal-processing unit, for forming a judgment as to whether said transfer direction of said tape-shaped recording medium transferred by said transfer means is said forward direction or said reverse direction, and for controlling said signal-processing unit in accordance with a result of said judgment, wherein when a magnetic head causing a large thermal asperity noise is employed as said recording head and an outcome of said judgment indicates that said transfer direction of said tape-shaped recording medium is said forward direction, said control unit controls said signal-processing unit so that a line recording density is increased to a value greater than a value of a line recording density for said reverse direction.

25. The recording and reproducing apparatus for a tape-shaped recording medium in accordance with claim 24, wherein said control unit increases a frequency of a clock signal supplied to said signal-processing unit.

26. A recording and reproducing apparatus for a tape-shaped recording medium having an anisotropic property oblique in a direction relative to a thickness direction thereof, said recording and reproducing apparatus comprising:

transfer means capable for transferring said tape-shaped recording medium in a forward direction in both a recording mode and a reproducing mode and capable for transferring said tape-shaped recording medium in a reverse direction in both said recording mode and said reproducing mode;

a recording and/or reproducing head arranged to create a recording track in a direction parallel to said forward and reverse transfer directions of said tape-shaped recording medium for scanning said tape-shaped recording medium along said recording track;

a signal-processing unit connected to said recording and/or reproducing head and supplied with a signal to be recorded and with an output signal from said reproducing head, said signal-processing unit carrying out signal processing required for the recording operation on a signal to be recorded and carrying out signal processing required for a reproducing operation on the output signal from said reproducing head; and a control unit for controlling operations of said signal-processing unit, for forming a judgment as to whether said transfer direction of said tape-shaped recording medium transferred by said transfer means is said forward direction or said reverse direction, and for controlling said signal-processing unit in accordance with a result of said judgment, wherein when a magnetic head causing a large thermal asperity noise is employed as said recording head and an outcome of said judgment indicates that said transfer direction of said tape-shaped recording medium is said reverse direction, said control unit controls said signal-processing unit so that a line recording density is decreased to a value smaller than a value of a line recording density for said forward direction.

27. The recording and reproducing apparatus for a tape-shaped recording medium in accordance with claim 26, wherein said control unit decreases a frequency of a clock signal supplied to said signal-processing unit.

28. A recording and reproducing apparatus for a tape-shaped recording medium having an anisotropic property oblique in a direction relative to a thickness direction thereof, said recording and reproducing apparatus comprising:

transfer means capable for transferring said tape-shaped recording medium in a forward direction in both a recording mode and a reproducing mode and capable for transferring said tape-shaped recording medium in a reverse direction in both said recording mode and said reproducing mode;

a recording and/or reproducing head arranged to create a recording track in a direction parallel to said forward and reverse transfer directions of said tape-shaped recording medium for scanning said tape-shaped recording medium along said recording track;

a signal-processing unit connected to said recording and/or reproducing head and supplied with a signal to be recorded and with an output signal from said reproducing head, said signal-processing unit carrying out signal processing required for the recording operation on a signal to be recorded and carrying out signal processing required for a reproducing operation on the output signal from said reproducing head; and a control unit for controlling operations of said signal-processing unit, for forming a judgment as to whether said transfer direction of said tape-shaped recording medium transferred by said transfer means is said forward direction or said reverse direction, and for controlling said signal-processing unit in accordance with a result of said judgment, wherein when a magnetic head causing a small thermal asperity noise is employed as said recording head and an outcome of said judgment indicates that said transfer direction of said tape-shaped recording medium is said forward direction, said control unit controls said signal-processing unit so that said reproduced signal output by said reproducing head is subjected to signal processing carried out on a frequency characteristic by adoption of a method known as partial response class 4.

29. The recording and reproducing apparatus for a tape-shaped recording medium in accordance with claim 28, wherein said signal-processing unit carries out signal processing on a phase characteristic of said reproduced signal output by said reproducing head at a first angle over an entire frequency band of said reproduced signal.

30. The recording and reproducing apparatus for a tape-shaped recording medium in accordance with claim 29, wherein, after said signal processing is carried out on said phase characteristic of said reproduced signal output by said reproducing head, said signal-processing unit carries out decoding processing by adoption of a method known as partial response class 4 on said reproduced signal.

31. The recording and reproducing apparatus for a tape-shaped recording medium in accordance with claim 29, wherein:

when a magnetic head causing a small thermal asperity noise is employed as said recording head and an outcome of said judgment indicates that said transfer direction of said tape-shaped recording medium is said reverse direction, said control unit controls said signal-processing unit so that said reproduced signal output by said reproducing head is subjected to signal processing carried out on a frequency characteristic by adoption of a method known as partial response class 1.

32. The recording and reproducing apparatus for a tape-shaped recording medium in accordance with claim 31, wherein said signal-processing unit carries out signal processing on a phase characteristic of said reproduced signal output by said reproducing head at a predetermined angle over an entire frequency band of said reproduced signal.

33. The recording and reproducing apparatus for a tape-shaped recording medium in accordance with claim 32, wherein, after said signal processing is carried out on said phase characteristic of said reproduced signal output by said reproducing head, said signal-processing unit carries out decoding processing by adoption of a method known as partial response class 1 on said reproduced signal.

34. A recording and reproducing apparatus for a tape-shaped recording medium having an anisotropic property oblique in a direction relative to a thickness direction thereof, said recording and reproducing apparatus comprising:

transfer means capable for transferring said tape-shaped recording medium in a forward direction in both a recording mode and a reproducing mode and capable for transferring said tape-shaped recording medium in a reverse direction in both said recording mode and said reproducing mode;

a recording and/or reproducing head arranged to create a recording track in a direction parallel to said forward and reverse transfer directions of said tape-shaped recording medium for scanning said tape-shaped recording medium along said recording track;

a signal-processing unit connected to said recording and/or reproducing head and supplied with a signal to be recorded and with an output signal from said reproducing head, said signal-processing unit carrying out signal processing required for the recording operation on a signal to be recorded and carrying out signal processing required for a reproducing operation on the output signal from said reproducing head; and a control unit for controlling operations of said signal-processing unit, for forming a judgment as to whether said transfer direction of said tape-shaped recording medium transferred by said transfer means is said forward direction or said reverse direction, and for controlling said signal-processing unit in accordance with a result of said judgment, wherein when a magnetic head causing a large thermal asperity noise is employed as said recording head and an outcome of said judgment indicates that said transfer direction of said tape-shaped recording medium is said forward direction, said control unit controls said signal-processing unit so that said reproduced signal output by said reproducing head is subjected to signal processing carried out on a frequency characteristic.

35. The recording and reproducing apparatus for a tape-shaped recording medium in accordance with claim 34, wherein said signal-processing unit carries out signal processing on a phase characteristic of said reproduced signal output by said reproducing head at a first angle over an entire frequency band of said reproduced signal.

36. The recording and reproducing apparatus for a tape-shaped recording medium in accordance with claim 35, wherein, after said signal processing is carried out on said phase characteristic of said reproduced signal output by said reproducing head, said signal-processing unit carries out decoding processing on said reproduced signal by adoption of a method known as partial response class 4.

37. A recording and reproducing apparatus for a tape-shaped recording medium having an anisotropic property oblique in a direction relative to a thickness direction thereof, said recording and reproducing apparatus comprising:

transfer means capable for transferring said tape-shaped recording medium in a forward direction in both a recording mode and a reproducing mode and capable for transferring said tape-shaped recording medium in a reverse direction in both said recording mode and said reproducing mode;

a recording and/or reproducing head arranged to create a recording track in a direction parallel to said forward and reverse transfer directions of said tape-shaped recording medium for scanning said tape-shaped recording medium along said recording track;

a signal-processing unit connected to said recording and/or reproducing head and supplied with a signal to be recorded and with an output signal from said reproducing head, said signal-processing unit carrying out signal processing required for the recording operation on a signal to be recorded and carrying out signal processing required for a reproducing operation on the output signal from said reproducing head; and a control unit for controlling operations of said signal-processing unit, for forming a judgment as to whether said transfer direction of said tape-shaped recording medium transferred by said transfer means is said forward direction or said reverse direction, and for controlling said signal-processing unit in accordance with a result of said judgment, wherein when a magnetic head causing a large thermal asperity noise is employed as said recording head and an outcome of said judgment indicates that said transfer direction of said tape-shaped recording medium is said reverse direction, said control unit controls said signal-processing unit so that said reproduced signal output by said reproducing head is subjected to signal processing carried out on a frequency characteristic.

38. The recording and reproducing apparatus for a tape-shaped recording medium in accordance with claim 37, wherein said signal-processing unit carries out signal processing on a phase characteristic of said reproduced signal output by said reproducing head at a predetermined angle over an entire frequency band of said reproduced signal.

39. The recording and reproducing apparatus for a tape-shaped recording medium in accordance with claim 38, wherein, after said signal processing is carried out on said phase characteristic of said reproduced signal output by said reproducing head, said signal-processing unit carries out decoding processing on said reproduced signal by adoption of a method known as partial response class 4.

* * * * *

UNITED STATES PATENT AND TRADEMARK OFFICE
CERTIFICATE OF CORRECTION

PATENT NO. : 7,180,694 B2
APPLICATION NO. : 10/657695
DATED : February 20, 2007
INVENTOR(S) : Takashi Kawashima, Yutaka Okazaki and Yoichi Kanemaki It is certified that error appears in the above-identified patent and that said Letters Patent is hereby corrected as shown below:

In Column 13, Line 61, "µm" should read --m--.

Signed and Sealed this

Twenty-fourth Day of March, 2009

JOHN DOLL
*Acting Director of the United States Patent and Trademark Office*